United States Patent
Sakai et al.

(10) Patent No.: US 6,743,487 B2
(45) Date of Patent: Jun. 1, 2004

(54) RETARDATION FILM AND PROCESS FOR PRODUCING THE SAME

(75) Inventors: Takeya Sakai, Nagoya (JP); Masao Uetsuki, Kurashiki (JP); Nobuhiro Kawatsuki, Himeji (JP)

(73) Assignee: Hayashi Telempu Co., Ltd., Aichi (JP)

( * ) Notice: Subject to any disclaimer, the term of this patent is extended or adjusted under 35 U.S.C. 154(b) by 63 days.

(21) Appl. No.: 10/026,432

(22) Filed: Dec. 27, 2001

(65) Prior Publication Data

US 2002/0128341 A1 Sep. 12, 2002

(30) Foreign Application Priority Data

| Dec. 28, 2000 | (JP) | 2000-400356 |
| Jun. 28, 2001 | (JP) | 2001-196012 |
| Jun. 28, 2001 | (JP) | 2001-196013 |
| Sep. 7, 2001 | (JP) | 2001-271879 |

(51) Int. Cl.$^7$ ................ C09K 19/38; B05D 5/06; C08F 2/48

(52) U.S. Cl. ............ 428/1.2; 428/1.1; 428/1.23; 428/1.25; 428/1.26; 427/162; 427/163.2; 427/487; 427/508; 427/515

(58) Field of Search .............. 428/1.1, 1.2, 1.23, 428/1.25, 1.26, 447, 480, 500, 473.5, 474.4; 427/487, 508, 162, 515, 163.2, 372.2, 374.1, 384, 387

(56) References Cited

U.S. PATENT DOCUMENTS

| 4,915,867 A | * | 4/1990 | Morita et al. ............ 252/299.5 |
| 5,523,127 A | * | 6/1996 | Ohnishi et al. ............... 428/1.5 |
| 5,572,291 A | * | 11/1996 | Moriguchi et al. ......... 399/390 |
| 5,795,629 A | * | 8/1998 | Harada et al. ............. 428/1.23 |
| 6,423,385 B1 | * | 7/2002 | Kagawa et al. ............... 428/1.1 |

OTHER PUBLICATIONS

Machine Translation of JP 09–179102, Yamamoto, Jul. 1997, from JPO web–site.*

Machine Translation of JP 201–117102, Sakai et al., Apr. 2001, from JPO web–site.*

Patent Abstracts of Japan, Publication No. 10–278123, published Oct. 20, 1998.

Patent Abstracts of Japan, Publication No. 08–015681, published Jan. 19, 1996.

Patent Abstracts of Japan, Publication No. 07–287120, published Oct. 31, 1995.

Patent Abstracts of Japan, Publication No. 07–138308, published May 30, 1995.

* cited by examiner

*Primary Examiner*—Jeffrey B. Robertson
(74) *Attorney, Agent, or Firm*—Sughrue Mion, PLLC

(57) ABSTRACT

The invention relates primarily to a retardation film and a process for producing the retardation film, wherein a layer formed of a mixture of a photosensitive polymer and a low molecular weight compound is irradiated with linear polarized ultraviolet ray, ultraviolet ray including a perfectly polarized light component and a non-polarized light component, or a non-polarized ultraviolet ray to orient molecules thereby developing a retardation and the direction of the optical axis arbitrarily in the layer formed of a mixture.

7 Claims, 10 Drawing Sheets

RETARDATION FILM AND PROCESS FOR PRODUCING THE SAME

BACKGROUND OF THE INVENTION

1. Field of the Invention

The present invention relates to a retardation film or a phase difference film prepared by irradiating a layer of a mixture of a photosensitive polymer and a low molecular weight compound with linear polarized ultraviolet rays, ultraviolet rays including a perfectly polarized light component and non-polarized light component or non-polarized ultraviolet rays (hereinafter referred to as exposure according to the need) to give molecular orientation thereby developing a retardation and the direction of the optical axis optionally in the above layer of the mixture, and to a process for producing the retardation film.

2. Description of the Prior Art

The retardation films are films passing linear polarized light components oscillating in the major axis directions orthogonal to each other and having birefringence providing a given retardation between these two components. Such retardation films are also utilized in the fields of liquid crystal displays. Particularly retardation films, of which the optical axis is inclined against a principal surface of the film, specifically, the optical axis is inclined with the principal surface of the film and its normal line, serve to enlarge a viewing angle or angle of visibility of a liquid crystal display as optical compensation films decreasing the visual field dependency of the transmission quantity of light which is caused by the inclination of the molecular arrangement of a liquid crystal cell.

There are several prior art technologies for producing such retardation films.

As one of these technologies, there is a process in which a polymer material such as polycarbonate is stretched to orient a high molecular chain thereby producing a difference between the refractive index in the stretching direction and the refractive index in the direction orthogonal to the stretching direction. However, it is difficult to incline the optical axis against the principal surface of the film by this stretching method because molecules are oriented in the stretching direction.

Also, as a method for developing a retardation by exposure to polarized light, there is a method in which a photosensitive polymer such as polyvinyl cinnamate is irradiated with polarized UV light (JP A-7-138308). However, in this method, anisotropy is developed in a direction orthogonal to the direction of the electric field oscillation of the applied polarized UV light and the optical axis cannot be therefore inclined, so that a viewing angle is enlarged with difficulty.

To solve the foregoing problem, a method is known in which a liquid crystal monomer is aligned and fixed on an alignment layer obtained by irradiation with polarized UV light, rubbing treatment or slating deposition of SiO (JP A-8-15681). A method is also known in which a discotic liquid crystal is arranged on an alignment layer prepared by rubbing or an alignment layer prepared by SiO slanting deposition (each of JP A-7-287119 and JP A-7-287120). Further, a method is known in which a discotic liquid crystal containing a photo polymerization initiator is aligned on a photo alignment layer and this alignment is fixed by irradiation with light (JP A-10-278123). However, in these methods using an alignment layer, the process involving the aligning treatment of the alignment layer and the alignment of a liquid crystal material are complicated, raising the production cost of a retardation film which has a large area and inclined optical axis.

Moreover, as one of other processes for producing a retardation film having inclined optical axis, a method is proposed in which an inorganic dielectric is slant-deposited. This method poses the problems that a large scale apparatus is required to form a deposited film continuously on a lengthy sheet and that the process is complicated. The inventor of the present invention has proposed a process for producing a retardation film with inclined optical axis by exposing a side chain liquid crystalline polymer having photo-sensitivity to polarized light (JP A-10-278123). However, this method develops a large retardation, giving rise to the problems that the cloudiness is increased as the film is thickened.

SUMMARY OF THE INVENTION

The invention provides a retardation film suitable for mass production using a simple process and a process for producing the film.

According to a first aspect of the present invention, there is provided a process for producing a retardation film, the method comprising producing a retardation film by a process including a step of irradiating a mixture of a photosensitive polymer and a low molecular weight compound with light, wherein the ratio z of solubility parameters calculated from the evaporation energy and molecular volume of these photosensitive polymer and low molecular weight compound is as follows: $0.93<z<1.06$.

In this production process, the mixture of the photosensitive polymer and low molecular weight compound which are compatible is formed in film and exposed to light, whereby the photosensitive polymer and the low molecular weight compound can be oriented. When this exposure is conducted from a direction inclined with a principal surface of the layer formed of the aforementioned mixture, the layer can be oriented with its optical axis being arbitrarily inclined. Therefore, a retardation film with optical axis inclined in a desired direction is obtained.

The low molecular weight compound has the effect of suppressing cloudiness as far as its amount is proper, but on the contrary, causes an increase in cloudiness and a reduction in orientation property when the amount to be added is excessive. From this point of view, the amount of the low molecular weight compound is preferably 5 wt % to 50 wt % though it depends on the types of the photosensitive polymer or low molecular weight compound and the retardation film can be produced if the low molecular weight compound is added in the amount of 0.1 wt % to 80 wt %.

Here, when the compatibility between the photosensitive polymer and the low molecular weight compound is insufficient, a crystal with a size enough to induce phase separation and scattering of visible light by heating a substrate during film forming or after exposure is generated, causing an increase in cloudiness. In order to suppress the phase separation and the generation of microcrystals, it is necessary to control the compatibility between the polymer and the low molecular weight compound.

As a standard of this compatibility, the solubility parameter ($\sigma$) calculated from evaporation energy ($\Delta E_v$) and molecular volume (V) according to the calculation formula (1) as described in Polymer Engineering and Science, Vol. 7, No.2, 147 (1974) may be utilized for the sake of convenience. It has been found from the result of an experiment that when the ratio z of the solubility parameter (σ) of the polymer to the solubility parameter (σ) of the low molecular weight compound is in the range of 0.93<z<1.06, the phase separation and the generation of microcrystals are efficiently suppressed, whereby the cloudiness of the resulting retardation film can be decreased.

$$\sigma = (\Delta E_V/V)^{1/2} \qquad (1)$$

The adoption of the aforementioned production process enables mass production of a retardation film in a simple process. Also, the resulting retardation film has decreased cloudiness and is superior in the effect of enlarging a viewing angle when it is used for a liquid crystal display.

As the above photosensitive polymer to be used as the raw material of the retardation film, a liquid crystal material is preferably used.

In addition, as the photosensitive polymer, those preferably used are photosensitive homopolymers or copolymers which have at least one of structures represented by the following molecular structure 1 to 9 and in which the main chain represented by the molecular structure 10 is a hydrocarbon, acrylate, methacrylate, maleimide, N-phenylmaleimide or siloxane. Also, as the low molecular weight compound, those having a molecular structure represented by the molecular structure 11 or 12 are preferable.

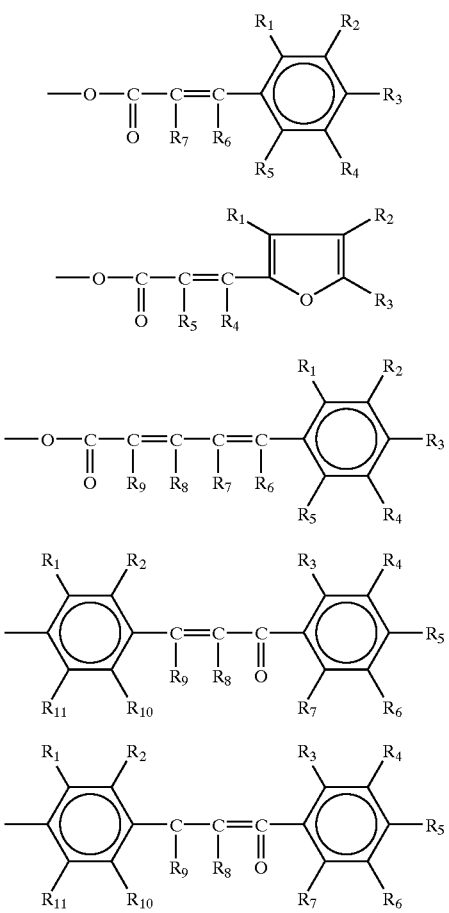

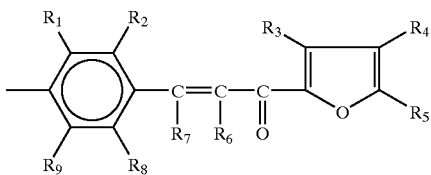

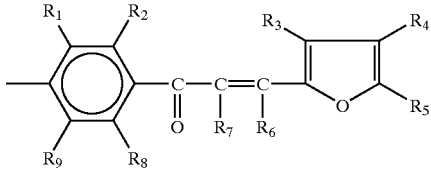

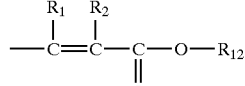

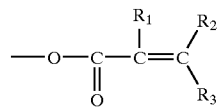

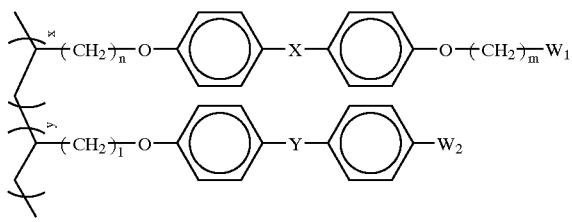

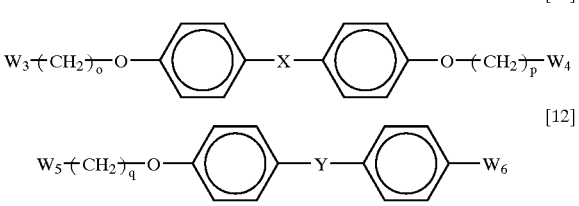

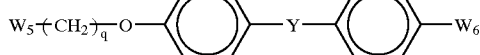

wherein —$R_1$ to —$R_{11}$=—H, halogen group, —CN, alkyl group or alkyloxy group, e.g., methoxy group or group obtained by fluorinating each of these groups, —$R_{12}$=alkyl group, e.g., methyl group or ethyl group or group obtained by fluorinating each of these groups, x:y=100 to 0:0 to 100, n=1 to 12, m=1 to 12, j=1 to 12, o=1 to 12, p=1 to 12, q=1 to 12, X, Y=none, —COO—, —OCO—, —N=N—, —C=C— or —$C_6H_4$—, $W_1$, $W_2$, $W_3$, $W_4$, $W_5$, $W_6$=structure represented by molecular structure 1, 2, 3, 4, 5, 6, 7, 8 or 9.

As the light with which the above mixture of the photosensitive polymer and the low molecular weight compound is irradiated, linear polarized light or light including a perfectly polarized light component and a non-polarized light component is preferably used. Also, the above light is preferably irradiated on both of opposite principal surfaces of the above mixture. Further, when producing the retardation film, it is also preferable to involve a heating step and/or a cooling step. Also, in the production of the retardation film, it is also preferable to crosslink the photosensitive polymer or low molecular weight compound constituting the film.

The retardation film of this invention is produced by the aforementioned production process according to the first aspect. The retardation film obtained in this manner has decreased cloudiness and is superior in the effect of enlarging a viewing angle when it is used for a liquid crystal display.

According to a second aspect of the present invention, there is provided a process for producing a retardation film, the method comprising irradiating a layer formed of a photosensitive polymer or a mixture of a photosensitive polymer and a low molecular weight compound with light while changing the incident angle of the light in regular sequence.

This production process according to the second aspect of the present invention enables the production of a retardation film (optically anisotropic element) effective to enlarge the viewing angle of a liquid crystal display in which the inclination of each optical axis of index ellipsoids (side chain portion of the photosensitive polymer) is no uniform in a simple process and also enables mass production.

In the aforementioned production process according to the second aspect of the present invention, it is preferable to irradiate the layer formed of the aforementioned photosensitive polymer or mixture of the photosensitive polymer and the low molecular weight compound in both directions of incoming to the opposite principal surfaces with the incident angle changing in sequence. Also, it is also preferable to include a heating step and/or a cooling step. It is also preferable to crosslink the photosensitive polymer or low molecular weight compound constituting the retardation film.

It is preferable to add a uniaxial index ellipsoid (side chain portion of the photosensitive polymer) layer or/and a biaxial index ellipsoid (side chain portion of the photosensitive polymer) layer to the aforementioned retardation film (optically anisotropic element). This structure ensures that a retardation film having a higher effect of enlarging a viewing angle when the film is used for a liquid crystal display is produced.

As the above photosensitive polymer to be used as the raw material of the above retardation film (optical anisotropic element), a liquid crystal material is preferably used.

According to a third aspect of the present invention, there is provided a process for producing a retardation film, the method comprising irradiating a layer formed of a photosensitive polymer or a mixture of a photosensitive polymer and a low molecular weight compound with linear polarized lights having electric field oscillation planes differing from each other in at least two directions, wherein the light irradiated at this time in at least one direction is irradiated in a direction oblique to the normal line of the aforementioned layer.

In this production process according to the third aspect of this invention, a layer which is oriented with the optical axis being arbitrarily inclined can be formed. A retardation film (optically anisotropic element) effective to enlarge the viewing angle of a liquid crystal display even if only one layer is used can be obtained in a simple process and also mass production is made possible.

The aforementioned process of irradiating with linear polarized light includes, for example, a step of irradiating the layer with a first linear polarized light in a direction oblique to the normal line of the layer and a step of irradiating the layer with a second linear polarized light whose electric field oscillation plane is on the same plane as that of the first light in the direction of the normal line of the layer. The aforementioned process of irradiating with light may include a step of irradiating the layer with a first linear polarized light in a direction oblique to the direction of the normal line of the layer and a step of irradiating the layer with a second linear polarized light whose electric field oscillation plane is orthogonal to that of the first linear polarized light in the direction of the normal line of the layer.

Also, in the aforementioned process of irradiating with light, the layer may be irradiated with linear polarized lights having electric field oscillation planes orthogonal to each other in two directions oblique to the direction of the normal line of the layer.

In the production process according to the third aspect of the present invention, the irradiation of the layer formed of the photosensitive polymer or the mixture of the photosensitive polymer and the low molecular weight compound with linear polarized light is preferably conducted on both of opposite principal surfaces, or on the two principal surfaces, of the layer. Also, the method preferably comprises a heating step and/or a cooling step. Further, it is also preferable to crosslink the photosensitive polymer or low molecular weight compound constituting the retardation film.

In addition, in the retardation film, two or more layers are preferably laminated in such an arrangement as to make respective optical anisotropic axes orthogonal or perpendicular to each other.

According to a fourth aspect of the present invention, there is provided a process for producing a retardation film, the method comprising irradiating a layer made of a photosensitive polymer containing a positive index ellipsoid structure or a mixture of the polymer and a low molecular weight compound with non-polarized light or light including a perfectly polarized light component and a non-polarized light component, to thereby control birefringence.

In the production process according to the fourth aspect of the present invention, a retardation film effective to enlarge the viewing angle of a liquid crystal display can be obtained in a simple process and also mass production is made possible by controlling the birefringence.

In the production process according to the fourth aspect of the present invention, it is preferable to control the ratio of three primary refractive indexes nx, ny and nz of the index ellipsoid in the film and the inclination of the nx axis with the direction of the normal line of the film surface by irradiating the layer made of the photosensitive polymer containing the positive index ellipsoid structure or the mixture of the polymer and the low molecular weight compound with non-polarized light or light including a perfectly polarized light component and a non-polarized light component. Here, the term "control" is, specifically, to develop the same birefringence as in the case of combining a slant-oriented index ellipsoid, bend-oriented index ellipsoid or non-slanted uniaxial index ellipsoid.

The aforementioned production process according to the fourth aspect of the present invention preferably comprises a step of heating and/or cooling the above layer. The method also preferably comprises a step of irradiating the layer made of the photosensitive polymer containing the positive index ellipsoid structure or the mixture of the polymer and the low molecular weight compound with non-polarized light or light including a perfectly polarized light component and a non-polarized light component in both directions of the surface and backface of the layer. Further, it is also preferable to irradiate the layer made of the photosensitive polymer containing the positive index ellipsoid structure or the mixture of the polymer and the low molecular weight compound with non-polarized light or light including a perfectly polarized light component and a non-polarized light component in a direction oblique to the direction of the normal line of the layer surface.

As the photosensitive polymer which is the raw material of the aforementioned retardation film, a liquid crystal material is preferably used. Also, as the low molecular weight compound which is the raw material of the retardation film, a crystalline or liquid crystal material is preferably used. Further, this low molecular weight compound preferably has a reactive group which is crosslinked or polymerized by light or heat. Also, when the above retardation film is produced, a step of crosslinking the photosensitive polymer and/or the low molecular weight compound is preferably involved.

The retardation film (optically anisotropic element) of the present invention which is produced by any one of the aforementioned second to fifth production process has a superior effect of enlarging a viewing angle when it is used for a liquid crystal display.

BRIEF DESCRIPTION OF THE DRAWINGS

The present invention will be understand more clearly from the following description of preferred embodiments with reference to the appended drawings. However, these embodiments and drawings are set forth for illustrative and descriptive purposes only and should not be used to define the scope of the invention. The scope of the invention is defined by the appended claims. In the accompanying drawings, like reference numerals are used to denote like parts throughout the several views.

In the drawings.

DETAILED DESCRIPTION OF EMBODIMENTS

Figure 1:
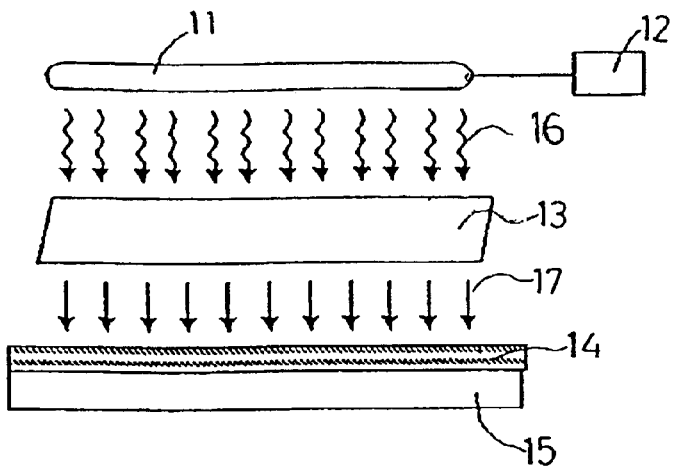
FIG. 1 is a conceptional view showing a first manufacturing apparatus for use in implementing a production process according to a first aspect of the present invention.

A first production process according to the present invention will be explained in detail.

In the first production process, a retardation film is produced in a process including a step of irradiating a mixture of a photosensitive polymer and a low molecular weight compound with light.

The aforementioned photosensitive polymer is a polymer having a side chain containing a structure comprising a combination of a substituent such as biphenyl, terphenyl, phenyl benzoate or azobenzene which is frequently used as the mesogene component of a liquid crystal polymer and a photosensitive group such as a cinnamic acid group (or its derivative group), and a main chain comprising a structure such as a hydrocarbon, acrylate, methacrylate, maleimide or N-phenylmaleimide and siloxane. The polymer may be either a homopolymer comprising the same repeat units or a copolymer of units having different structures, wherein a unit having a side chain containing no photosensitive group may be copolymerized.

The low molecular weight compound to be mixed is a crystalline or liquid crystal compound having a substituent such as biphenyl, terphenyl, phenyl benzoate or azobenzene which is frequently used as the mesogene component, which is combined with a functional group such as an aryl group, acrylate group, methacrylate group or cinnamate group (or its derivative group) either through or not through a bending component. When these low molecular component is mixed, not only a single compound but also plural types of compound may be mixed.

A solution of a mixture of the photosensitive polymer and the low molecular weight compound is coated (spin coating or casting) on a substrate to form a coating layer. The layer is isotropic when it is formed and the side chain portion of the photosensitive polymer and the low molecular weight compound are not oriented in a specific direction.

This state will be explained with reference to FIG. 2. In coating layer 20, side chain 2a which has a photosensitive group shown by the long ellipsoid and high-sensitive orientation, that is, it is oriented corresponding to the direction of the oscillation m of the irradiated polarized ultraviolet ray L and to the direction perpendicular to the direction of the advance of the irradiated light, side chain 2b having a poor-sensitive orientation and liquid crystal compound 2c shown by the column chromatography coexist at random. If this layer is exposed to polarized light, a photo-reaction of the side chain 2a which is oriented corresponding to the direction of the electric field oscillation of the irradiated light and in the direction perpendicular to the direction of the advance of the irradiated light proceeds predominantly in the initial stage. In order to advance this photo-reaction, it is necessary to irradiate with light having a wavelength allowing the photosensitive group portion represented by the molecular structure 1 to 9 to react. This wavelength is generally 200 to 500 nm and light having 250 to 400 nm among these wavelengths are highly effective in many cases, though this wavelength differs depending upon the types of —$R_1$ to —$R_{12}$ shown in the formula 1 to 9.

Figure 2:
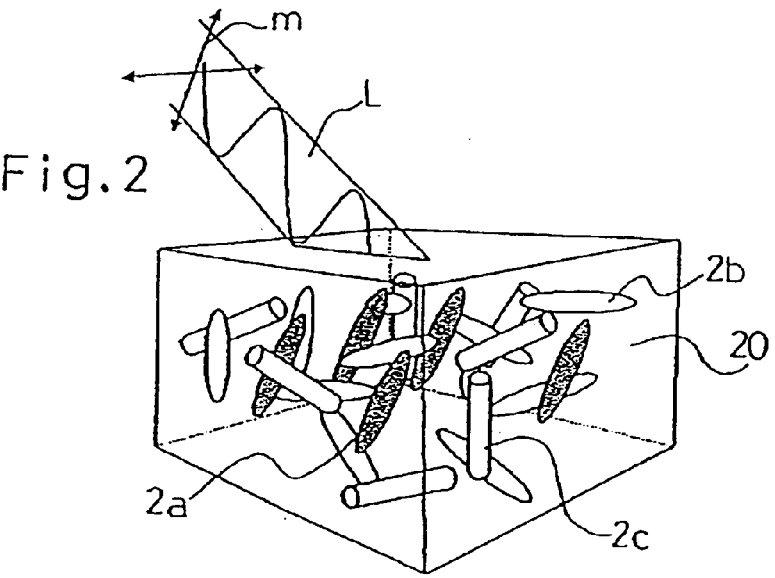
FIG. 2 is a schematic diagram showing the state of a side chain in the initial stage when exposed to polarized light.
Figure 3:
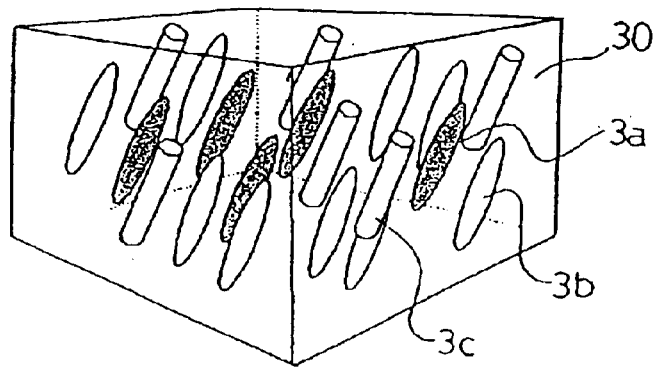
FIG. 3 is a schematic diagram showing the state of a side chain after exposed to polarized light.

When the reaction has been advanced by irradiating a film 20 shown in FIG. 2 with light, as shown in FIG. 3, the side chain 3b (2b) of the polymer and low molecular weight compound 3c (2c) which have not participated in the photo-reaction in the early stage are reoriented due to molecular motion during exposure. Specifically, the side chain 3b (2b) of the polymer and low molecular weight compound 3c (2c) which has not entered into a photo-reaction because they are not oriented in the direction perpendicular to both the direction of the electric field oscillation of the polarized light and to the direction of the advance of the irradiated light are reoriented in the same direction as the photo-reacted side chain 3a (2a). As a result, the side chain of the polymer and the molecule of the low molecular weight compound are oriented in the direction of the electric field oscillation m of the irradiated linear polarized light and in the direction perpendicular to the direction of the advance of the irradiated light, resulting in the production of a film 30 in which retardation is induced.

At this time, the film 30 can be oriented with the optical axis being arbitrarily inclined by carrying out the aforementioned exposure in a direction oblique to the surface of the layer. As a result, a retardation film whose optical axis is arranged in a desired direction is formed. To measure the inclination of the optical axis, a crystal rotation method in which the transmission strength of polarized light is measured while the sample to be measured is rotated as described in Japanese Applied Physics, Vol, 19, 2013 (1980) is used for the sake of convenience. In this measurement method, the three-dimensional birefringence of the sample to be measured may be measured from the angle dependency of the transmittance of the polarized light.

The orientation by a molecular motion during exposure is promoted by heating the layer. The heating temperature of the layer is preferably lower than the softening point of the photo-reacted portion and higher than each softening point of the side chain and low molecular weight compound which have not been photo-reacted. The layer in which the unreacted side chain is oriented by heating during exposure or the layer which is oriented by exposure under heating in this manner is cooled down to the softening point or less, whereby the molecules are frozen and thus the orientation layer of the present invention is obtained. In the case where the low molecular weight compound has heat- or photo-reactivity among the low molecular weight compounds and/or to the polymer, the orientation is fully fixed and an improvement in heat resistance is therefore expected. In this case, it is necessary to control the density of photo-reaction points by limiting the quantity of exposure or controlling the reactivity so as not to prevent molecular motion during reorientation.

Here, in order to restrain the cloudiness of the retardation film by controlling the compatibility between the aforementioned polymer and low molecular weight compound, it is important to design the ratio z of solubility parameters calculated from the evaporation energy and molecular volume to be in the range of $0.93<z<1.06$. The adoption of this range ensures that the phase separation and the generation of microcrystals are efficiently suppressed, whereby the cloudiness of the resulting retardation film can be limited. It is to be noted that a departure from the above range causes high cloudiness of the retardation film.

As measures taken to make the layer thickness high to thereby obtain a large retardation, a method of laminating layers is exemplified. In this case, a material solution is coated on the layer which has been previously formed and exposed to laminate. It is effective to use the polymer and the low molecular weight compound by dissolving them in a solvent decreased in solubility to prevent the breaking of the previously formed layer. Also, the birefringence comes to be developed more efficiently by exposing the layer of a mixture of the photosensitive polymer and the low molecular weight compound to light on both of opposite principal surfaces of the layer. In this case, the mixture of the photosensitive polymer and the low molecular weight compound is formed in film by, for example, coating them on a support and the exposure is carried out by irradiating with light to the layer surface either directly or through the support.

When the exposure is carried out through the support, any material may be used for the support as far as it can transmit light having a wavelength enabling the reaction of the photosensitive polymer. However, the higher the light transmittance of the support is, the more greatly the exposure amount is decreased, which is advantageous in a production process. Also, a method may be adopted in which the mixture of the photosensitive polymer and the low molecular weight compound is formed in film on a peelable support and thereafter the layer is peeled off and exposed to light on both of opposite principal surfaces of the layer.

Synthetic methods relating to raw material compounds for the photosensitive side chain liquid crystalline polymer and the low molecular weight compound will be shown below.

Monomer (1)

4,4'-biphenyldiol and 2-chloroethanol were heated in alkaline conditions to synthesize 4-hydroxy-4'-hydroxyethoxybiphenyl. 1,6-dibromohexane was reacted with the product in alkaline conditions to synthesize 4-(6-bromohexyloxy)-4'-hydroxyethoxybiphenyl. Next, lithium methacrylate was reacted with the resulting product to synthesize 4-hydroxyethoxy-4'-(6'-biphenyloxyhexyl) methacrylate. Finally, cinnamoyl chloride was added to the resulting product in basic conditions to synthesize a methacrylic ester ate shown by the molecular structure 13.

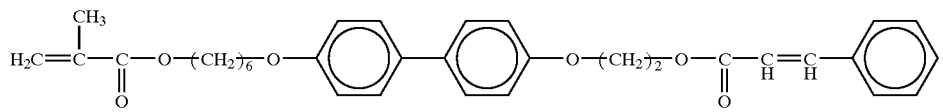

[13]

Monomer (2)

4,4'-biphenyldiol and 2-chlorohexanol were heated in alkaline conditions to synthesize 4-hydroxy-4'- hydroxyethoxybiphenyl. 1,6-dibromohexane was reacted with the product in alkaline conditions to synthesize 4-(6-bromohexyloxy)-4'-hydroxyethoxybiphenyl. Next, lithium methacrylate was reacted with the resulting product to synthesize 4-hydroxyethoxy-4'-(6'-biphenyloxyhexyl) methacrylate. Finally, 4-methoxy cinnamoyl chloride was added to the resulting product in basic conditions to synthesize a methacrylic ester ate shown by the molecular structure 14.

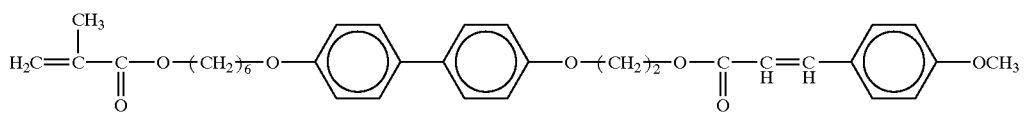

[14]

Polymer (1)

The aforementioned monomer (1) was dissolved in tetrahydrofuran, to which was added AIBN (azobisisobutyronitrile) to polymerize, thereby obtaining polymer (1). This polymer 1 exhibited liquid-crystallinity in a temperature range from 47 to 75° C.

Polymer (2)

The aforementioned monomer (2) was dissolved in tetrahydrofuran, to which was added AIBN to polymerize, thereby obtaining polymer (2). This polymer 2 also exhibited liquid-crystallinity.

Low Molecular Weight Compound (1)

4,4'-biphenyldiol was reacted with 1,6-dibromohexane in alkaline conditions to synthesize 4,4'-bis(6-bromohexyloxy) biphenyl. Next, lithium methacrylate was reacted with the product and the product was purified in a column chromatography to synthesize low molecular weight compound (1) shown by the molecular structure 15.

Low Molecular Weight Compound (2)

4,4'-biphenyldiol was reacted with 2-chloroethanol in alkaline conditions to synthesize 4,4'-bis (2-hydroxyethoxy) biphenyl. Next, cinnamoyl chloride was added to and reacted with the product in basic conditions and the product was purified in a column chromatography to synthesize low molecular weight compound (2) shown by the molecular structure 16.

Low Molecular Weight Compound (3)

4,4'-biphenyldiol was reacted with 6-bromohexanol in alkaline conditions to synthesize 4,4'-bis (6-bromohexyloxy) biphenyl. Next, cinnamoyl chloride was added to and reacted with the product in basic conditions and the product was purified in a column chromatography to synthesize low molecular weight compound (3) shown by the molecular structure 17.

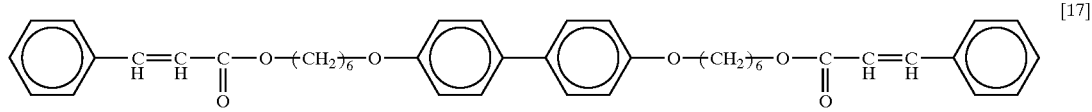

[17]

Low Molecular Weight Compound (4)

4,4'-biphenyldiol was reacted with 6-bromohexanol in alkaline conditions to synthesize 4-hydroxy-4'-hydroxyhexyloxybiphenyl. Next, 1,6-dibromohexane was reacted with the product in alkaline conditions to synthesize 4-(6-bromohexyloxy)-4'-hydroxyhexyloxybiphenyl. Next, lithium methacrylate was reacted with the product and the resulting product was purified in a column chromatography to synthesize 4-(6-methacryloylhexyloxy)-4'-hydroxyhexyloxybiphenyl. Finally, cinnamoyl chloride was added to and reacted with the product in basic conditions to synthesize low molecular weight compound (4) shown by

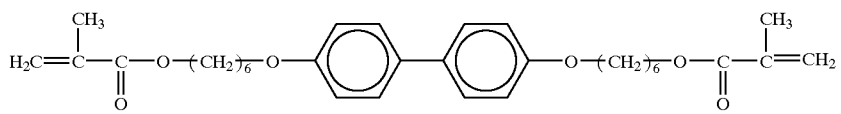

[15]

the molecular structure 18.

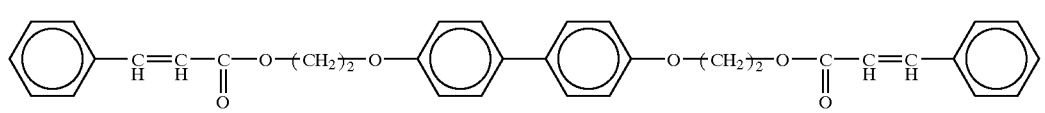

[16]

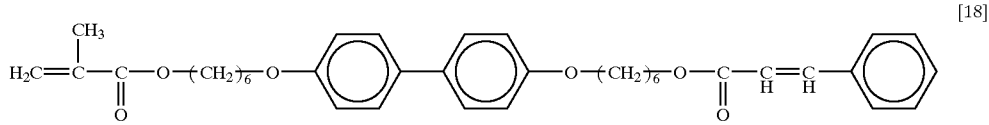

[18]

Low Molecular Weight Compound (5) (Comparison)

4,4'-biphenyldiol was reacted with 1,6-dibromodecane in alkaline conditions to synthesize 4,4'-bis (6-bromodecanyl) biphenyl. Next, lithium methacrylate was reacted with the product and the resultant product was purified in a column chromatography to synthesize low molecular weight compound (5) shown by the molecular structure 19.

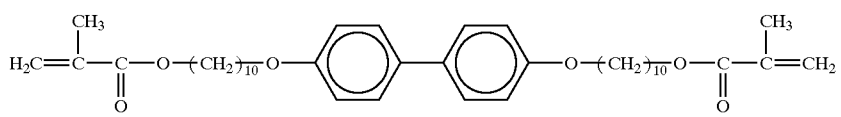

[19]

Low Molecular Weight Compound (6) (Comparison)

p-Hydroxybenzoic acid methyl ester and allyl bromide were heated in alkaline conditions to synthesize 4-allyloxybenzoic acid methyl ester. This product was heated in alkaline conditions to synthesize 4-allyloxybenzoic acid. Next, the product was reacted with thionyl chloride to synthesize 4-allyloxybenzoyl chloride, which was then reacted with hydroquinone to synthesize low molecular weight compound (6) shown by the molecular structure 20.

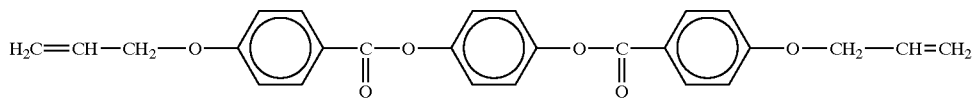

[20]

In FIG. 1, an example of a production apparatus used in the case where the retardation film of the present invention is produced by carrying out exposure with linear polarized ultraviolet light is shown. However, the process for producing the retardation film according to the present invention is not limited to this example.

Random light 16 generated from a ultraviolet lamp 11 excited by a power source 12 is converted into a linear polarized ultraviolet ray 17 by using an optical element 13 (e.g., Glan-Taylor prism) and then the ultraviolet ray 17 is irradiated to a layer 14 consisting of a photosensitive side chain liquid crystalline polymer and a liquid crystal compound coated on a substrate 15. Examples 1 to 12 show respective examples in which a retardation film with inclined optical axis is produced by the first production process.

EXAMPLE 1

3.75 wt % of the aforementioned polymer (1) and 1.25 wt % of the aforementioned low molecular weight compound (1) were dissolved in dichloroethane and the mixed solution was spin-coated on an optically isotropic substrate in a thickness of about 1 µm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 100 mJ/cm$^2$. Subsequently, the substrate was heated to 100° C. and then cooled to room temperature. In the substrate obtained in this manner, the optical axis was inclined at an angle of 67 degrees with the normal line of the substrate. The substrate was measured using the aforementioned crystal rotation method and as a result, a retardation of the substrate plane was 31 nm and almost no cloudiness was observed, showing that this product had a quality enough to be put to practical use.

EXAMPLE 2

3.75 wt % of the aforementioned polymer (1) and 1.25 wt % of the aforementioned low molecular weight compound (2) were dissolved in dichloroethane and the mixed solution was spin-coated on an optically isotropic substrate in a thickness of about 1 µm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 400 mJ/cm$^2$. Subsequently, the substrate was heated to 100° C. and then cooled to room temperature. In the substrate obtained in this manner, the optical axis was inclined at an angle of 68 degrees with the normal line of the substrate. The substrate was measured using the aforementioned crystal rotation method and as a result, a retardation of the substrate plane was 4 nm.

EXAMPLE 3

3.75 wt % of the aforementioned polymer (1) and 1.25 wt % of the aforementioned low molecular weight compound (3) were dissolved in dichloroethane and the mixed solution was spin-coated on an optically isotropic substrate in a thickness of about 1 µm. The substrate was arranged at an inclined angle of 45 degrees with a horizontal plane and the substrate was irradiated with the ultraviolet ray converted into linear polarized light by using a Glan-Taylor prism at room temperature from a direction perpendicular to the horizontal plane at an intensity of 400 mJ/cm$^2$.

Subsequently, the substrate was heated to 100° C. and then cooled to room temperature. In the substrate obtained in this manner, the optical axis was inclined at an angle of 67 degrees with the normal line of the substrate. The substrate was measured using the aforementioned crystal rotation method and as a result, a retardation of the substrate plane was 25 nm.

EXAMPLE 4

3.75 wt % of the aforementioned polymer (1) and 1.25 wt % of the aforementioned low molecular weight compound (4) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 200 mJ/cm$^2$. Subsequently, the substrate was heated to 100° C. and then cooled to room temperature. In the substrate obtained in this manner, the optical axis was inclined at an angle of 67 degrees with the normal line of the substrate. The substrate was measured using the aforementioned crystal rotation method and as a result, a retardation of the substrate plane was 43 nm.

EXAMPLE 5

3.75 wt % of the aforementioned polymer (1) and 1.25 wt % of the aforementioned monomer (1) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 200 mJ/cm$^2$. Subsequently, the substrate was heated to 100° C. and then cooled to room temperature. In the substrate obtained in this manner, the optical axis was inclined at an angle of 69 degrees with the normal line of the substrate. The substrate was measured using the aforementioned crystal rotation method and as a result, a retardation of the substrate plane was 35 nm.

EXAMPLE 6

3.75 wt % of the aforementioned polymer (2) and 1.25 wt % of the aforementioned low molecular weight compound (1) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature from a direction perpendicular to the horizontal plane at an intensity of 100 mJ/cm$^2$. Subsequently, the substrate was heated to 100° C. and then cooled to room temperature. In the substrate obtained in this manner, the optical axis was inclined at an angle of 67 degrees with the normal line of the substrate. The substrate was measured using the aforementioned crystal rotation method and as a result, a retardation of the substrate plane was 25 nm.

EXAMPLE 7

3.75 wt % of the aforementioned polymer (2) and 1.25 wt % of the aforementioned low molecular weight compound (2) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 400 mJ/cm$^2$. Subsequently, the substrate was heated to 100° C. and then cooled to room temperature. In the substrate obtained in this manner, the optical axis was inclined at an angle of 67 degrees with the normal line of the substrate. The substrate was measured using the aforementioned crystal rotation method and as a result, a retardation of the substrate plane was 3 nm.

EXAMPLE 8

3.75 wt % of the aforementioned polymer (2) and 1.25 wt % of the aforementioned low molecular weight compound (3) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 400 mJ/cm$^2$. Subsequently, the substrate was heated to 100° C. and then cooled to room temperature. In the substrate obtained in this manner, the optical axis was inclined at an angle of 65 degrees with the normal line of the substrate. The substrate was measured using the aforementioned crystal rotation method and as a result, a retardation of the substrate plane was 23 nm.

EXAMPLE 9

3.75 wt % of the aforementioned polymer (2) and 1.25 wt % of the aforementioned low molecular weight compound (4) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 200 mJ/cm$^2$. Subsequently, the substrate was heated to 100° C. and then cooled to room temperature. In the substrate obtained in this manner, the optical axis was inclined at an angle of 68 degrees with the normal line of the substrate. The substrate was measured using the aforementioned crystal rotation method and as a result, a retardation of the substrate plane was 39 nm.

EXAMPLE 10

3.75 wt % of the aforementioned polymer (2) and 1.25 wt % of the aforementioned monomer (1) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 200 mJ/cm$^2$. Subsequently, the substrate was heated to 100° C. and then cooled to room temperature. In the substrate obtained in this manner, the optical axis was inclined at an angle of 67 degrees with the normal line of the substrate. The substrate was measured using the aforemen-

EXAMPLE 11

3.75 wt % of the aforementioned polymer (1) and 1.25 wt % of the aforementioned low molecular weight compound (1) were dissolved in dichloroethane and the mixed solution was spin-coated on an optically isotropic substrate in a thickness of about 1 μm. The substrate was arranged at an inclined angle of 20 degrees with a horizontal plane and the substrate was irradiated with the ultraviolet ray converted into linear polarized light by using a Glan-Taylor prism at room temperature in a direction perpendicular to the horizontal plane at an intensity of 200 mJ/cm$^2$. Subsequently, the substrate was heated to 100° C. and then cooled to room temperature. In the substrate obtained in this manner, the optical axis was inclined at an angle of 81 degrees with the normal line of the substrate. The substrate was measured using the aforementioned crystal rotation method and as a result, a retardation of the substrate plane was 29 nm.

EXAMPLE 12

3.75 wt % of the aforementioned polymer (1) and 1.25 wt % of the aforementioned low molecular weight compound (4) were dissolved in dichloroethane and the mixed solution was spin-coated on an optically isotropic substrate in a thickness of about 1 μm. The substrate was arranged at an inclined angle of 20 degrees with a horizontal plane and the substrate was irradiated with the ultraviolet ray converted into linear polarized light by using a Glan-Taylor prism at room temperature in a direction perpendicular to the horizontal plane at an intensity of 200 mJ/cm$^2$. Subsequently, the substrate was heated to 100° C. and then cooled to room temperature. In the substrate obtained in this manner, the optical axis was inclined at an angle of 80 degrees with the normal line of the substrate. The substrate was measured using the aforementioned crystal rotation method and as a result, a retardation of the substrate plane was 39 nm.

Comparison 1

3.75 wt % of the aforementioned polymer (1) and 1.25 wt % of the aforementioned low molecular weight compound (5) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 100 mJ/cm$^2$. Subsequently, the substrate was heated to 100° C. and then cooled to room temperature. The substrate obtained in this manner was not a product having a quality enough to put to practical use because cloudiness occurred.

Comparison 2

3.75 wt % of the aforementioned polymer (1) and 1.25 wt % of the aforementioned low molecular weight compound (6) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 100 mJ/cm$^2$. Subsequently, the substrate was heated to 100° C. and then cooled to room temperature. The substrate obtained in this manner was not a product having a quality enough to put to practical use because cloudiness occurred.

Comparison 3

3.75 wt % of the aforementioned polymer (2) and 1.25 wt % of the aforementioned low molecular weight compound (5) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 100 mJ/cm$^2$. Subsequently, the substrate was heated to 100° C. and then cooled to room temperature. The substrate obtained in this manner was not a product having a quality enough to put to practical use because cloudiness occurred.

Comparison 4

3.75 wt % of the aforementioned polymer (2) and 1.25 wt % of the aforementioned low molecular weight compound (6) were dissolved in dichloroethane and the mixed solution was spin-coated on an optically isotropic substrate in a thickness of about 1 μm. The substrate was arranged at an inclined angle of 45 degrees with a horizontal plane and the substrate was irradiated with the ultraviolet ray converted into linear polarized light by using a Glan-Taylor prism at room temperature in a direction perpendicular to the horizontal plane at an intensity of 100 mJ/cm$^2$. Subsequently, the substrate was heated to 100° C. and then cooled to room temperature. The substrate obtained in this manner was a product having a quality enough to put to practical use because cloudiness occurred.

The results of Examples 1 to 12 and Comparisons 1 to 4 are listed in Table 1.

|  | Structure of the photosensitive compound | Ratio of solubility parameters (low molecular compound/polymer) | Evaluation of cloudiness | Angle of irradiation (degrees) | Inclination of the optical axis (degrees) | Phase difference in the plane (nm) |
| --- | --- | --- | --- | --- | --- | --- |
| Example 1 | Polymer 1/Low molecular compound 1 | 0.932 | ○ | 45 | 67 | 31 |
| Example 2 | Polymer 1/Low molecular compound 2 | 1.020 | ◎ | 45 | 68 | 4 |
| Example 3 | Polymer 1/Low molecular compound 3 | 0.970 | ◎ | 45 | 67 | 25 |
| Example 4 | Polymer 1/Low molecular compound 4 | 0.953 | ◎ | 45 | 67 | 43 |
| Example 5 | Polymer 1/Monomer 1 | 0.975 | ◎ | 45 | 69 | 35 |
| Example 6 | Polymer 2/Low molecular compound 1 | 0.955 | ○ | 45 | 67 | 25 |
| Example 7 | Polymer 2/Low molecular compound 2 | 1.044 | ◎ | 45 | 67 | 3 |
| Example 8 | Polymer 2/Low molecular compound 3 | 0.994 | ◎ | 45 | 65 | 23 |
| Example 9 | Polymer 2/Low molecular compound 4 | 0.976 | ◎ | 45 | 68 | 39 |

-continued

| | Structure of the photosensitive compound | Ratio of solubility parameters (low molecular compound/polymer) | Evaluation of cloudiness | Angle of irradiation (degrees) | Inclination of the optical axis (degrees) | Phase difference in the plane (nm) |
|---|---|---|---|---|---|---|
| Example 10 | Polymer 2/Monomer 1 | 0.998 | ⊚ | 45 | 67 | 30 |
| Example 11 | Polymer 1/Low molecular compound 1 | 0.932 | ⊚ | 20 | 81 | 29 |
| Example 12 | Polymer 1/Low molecular compound 4 | 0.953 | ⊚ | 20 | 80 | 39 |
| Comparison 1 | Polymer 1/Low molecular compound 5 | 0.903 | Δ | 45 | 67 | 16 |
| Comparison 2 | Polymer 1/Low molecular compound 6 | 1.068 | x | 45 | 67 | 46 |
| Comparison 3 | Polymer 2/Low molecular compound 5 | 0.926 | Δ | 45 | 66 | 15 |
| Comparison 4 | Polymer 2/Low molecular compound 6 | 1.094 | x | 45 | 67 | 40 |

Evaluation of cloudiness
⊚: extremely small
o: small
Δ: exist
x: large

As is apparent from Table 1, in each Example, a retardation film which is more reduced in cloudiness as compared with that obtained in each Comparison and in which the direction of the optical axis is optionally controlled is obtained.

In this first production process, the film in which birefringence (retardation) is produced by exposure is further irradiated with a ultraviolet ray to promote a photo-reaction of the unreacted photosensitive group, whereby orientation in the film can be fixed firmly. Such a retardation film is superior in heat resistance and photo-stability and is therefore a practically valuable product.

Next, a second production process according to the present invention will be explained.

In this second production process, also the same materials as in the aforementioned first production process are used as the raw materials of a retardation film.

In this second production process, a quite new retardation film with ununiformly inclined optical axes is produced by irradiating a layer formed of a photosensitive polymer or of a mixture of a photosensitive polymer and a low molecular weight compound with light in at least two directions differing in incident angle from each other.

Figure 4:
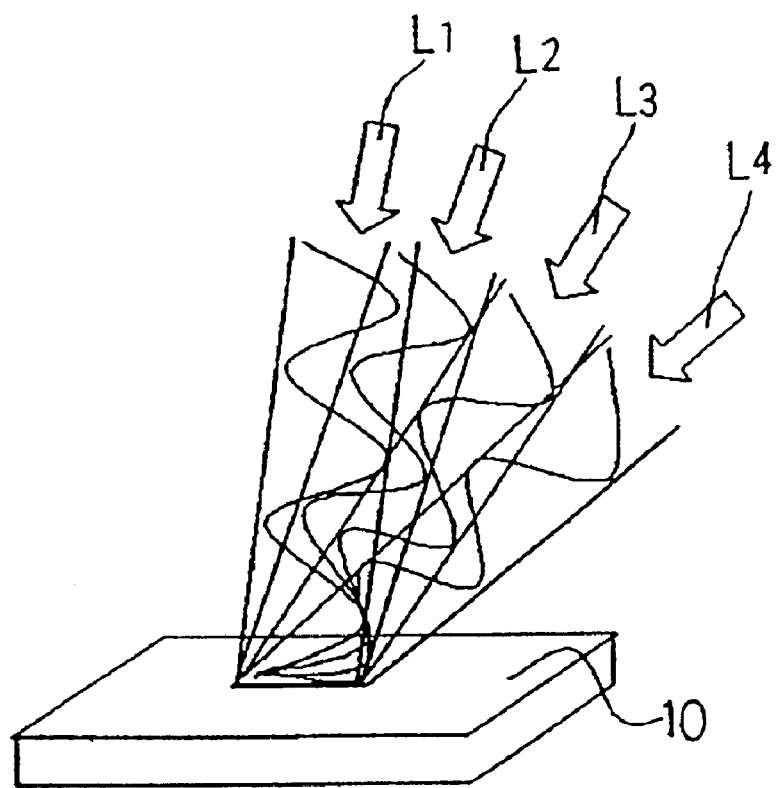
FIG. 4 is a conceptional view showing a production process according to a second aspect of the present invention.
Figure 5:
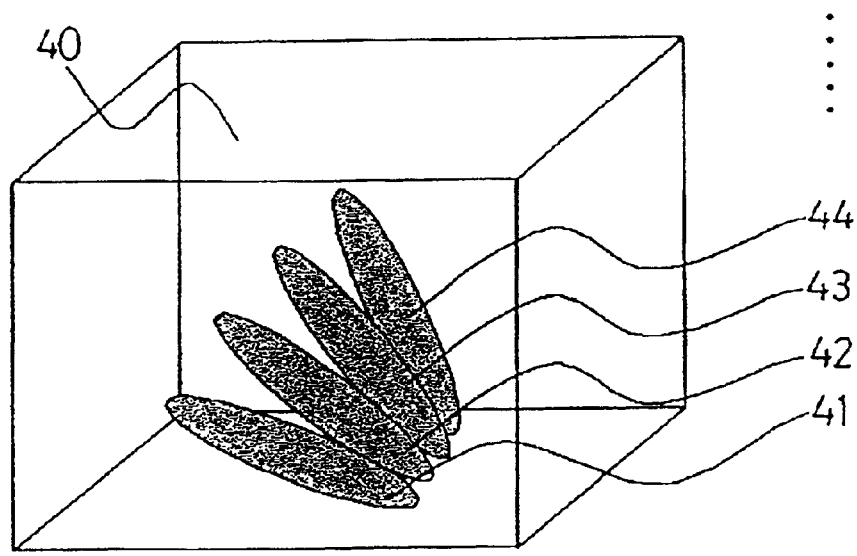
FIG. 5 is a schematic diagram showing an index ellipsoid of a retardation film obtained in a production process according to a second aspect of the present invention.

Specifically, as shown in FIG. 4, each light-irradiation ($L_1$, $L_2$, $L_3$, $L_4$, . . . ) of a layer 10 formed of the photosensitive polymer or of the mixture of the photosensitive polymer and the low molecular weight compound is repeated at each different incident angle, allowing index ellipsoids (side chain portions of the photosensitive polymers) (41, 42, 43, 44, . . . ) differing in inclination from each other to be intermingled in the layer 40 as shown in FIG. 5.

In the case of such a retardation film, the angle dependency of the retardation coincides with a value calculated in the case of laminating index ellipsoids having optical axes differing from each other. It has been confirmed that this retardation film is equal to a retardation film in which index ellipsoids (side chain portion of the photosensitive polymer) are bend-oriented (see FIG. 6). The optical characteristics of such a retardation film should be designed based on the optical characteristics of a liquid crystal display on which the retardation film is to be mounted.

For the optical compensation of a liquid crystal display, it is required to regulate the retardation of the retardation film in consideration of the retardation of a whole optical system constituting the device including a polarizing plate.

The aforementioned photosensitive polymer or mixture of the photosensitive polymer and the low molecular weight compound is formed in film by coating it on a substrate. As the substrate, a uniaxis index ellipsoid layer or/and a biaxial index ellipsoid layer may be used. Examples of the uniaxial index ellipsoid layer or/and biaxial index ellipsoid layer include those obtained by uniaxial or biaxial stretching of a polymer material such as polycarbonate or triacetylcellulose and those obtained by developing a retardation by irradiating such a photosensitive material as used in the present invention with light, though not limited to these materials and any material having desired optical characteristics may be used.

In this second production process, it is preferable to heat the layer in the same manner as in the case of the aforementioned first production process to promote orientation due to a molecular motion during exposure.

The cloudiness of the retardation film tends to be increased if the layer thickness is thickened and molecular orientation is disturbed. It is effective to thin the layer thickness for limiting the cloudiness. The thinningness of the layer thickness leads to a reduction in retardation. However, if both surfaces of the substrate are coated with the material solution and the layer thickness per layer is thinned, the cloudiness can be limited without decreasing the retardation of a whole entire film. In the second production process, the method of laminating layers in the same manner as in the case of the aforementioned first production process is also preferably adopted.

As raw materials to be used in the second production process for the production of a retardation film, polymer (1) shown by the molecular structure 13 and low molecular weight compound (1) shown by the molecular structure 15 which were synthesized in the same manner as in the case of the first production process were used.

Figure 8:
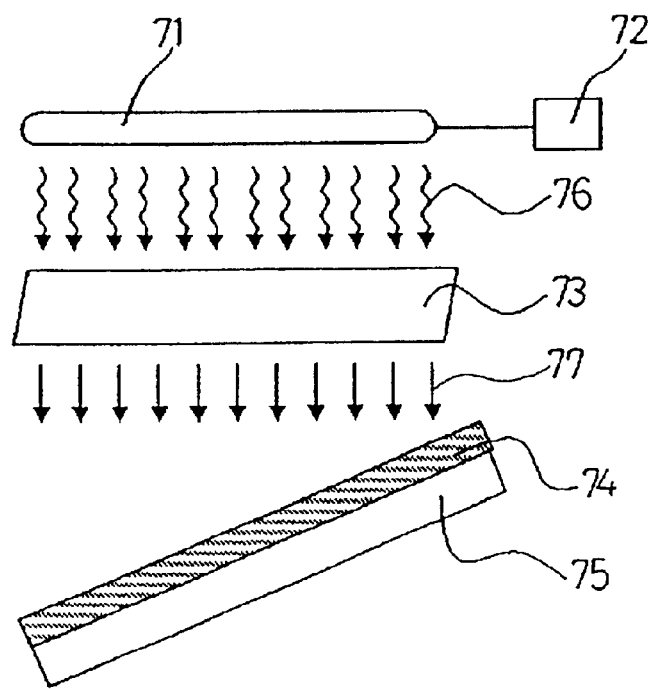
FIG. 8 is a conceptional view showing a second manufacturing apparatus for use in implementing a production process according to any one of second to fourth aspects of the present invention.

FIG. 8 shows an example of a production apparatus in the case of producing the retardation film of the present invention by polarization exposure with liner polarized ultraviolet light. However, this example is not intended to be limiting of the process for producing the retardation film of the present invention.

Random light 76 generated from ultraviolet lamp 71 excited by power source 72 is converted into linear polarized ultraviolet ray 77 by using optical element 73 (e.g., Glan-Taylor prism) and irradiated to film 74 of a photosensitive material coated on substrate 75.

Example 13 is an example in which a retardation film with optical axes inclined ununiformly was produced using the second production process according to the present invention. The angle dependency of the retardation of the film was found using a Senarmont method using a polarizer, a ¼ wavelength constant and an analyzer by measuring the extinction angle of the analyzer while rotating a sample to be measured by using a predetermined optical system.

EXAMPLE 13

Figure 6:
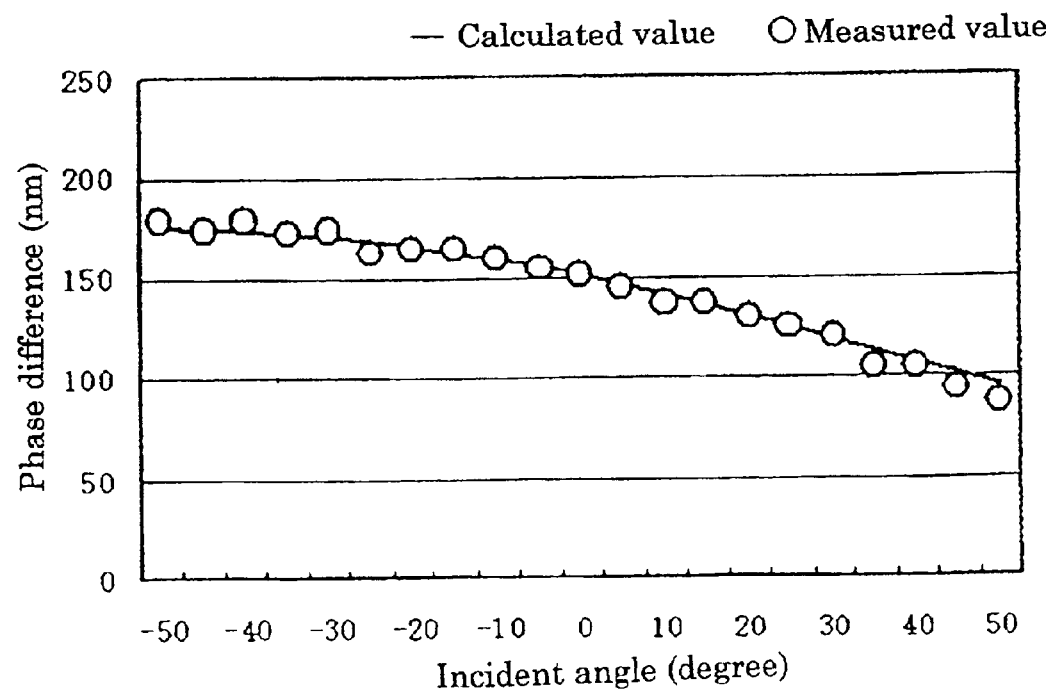
FIG. 6 is a graph showing a comparison between the retardation angle dependency of a retardation film in each example and its calculated value in a production process according to a second aspect of the present invention.

3.75 wt % of the aforementioned polymer (1) and 1.25 wt % of the aforementioned low molecular weight compound (1) were dissolved in dichloroethane and the mixed solution was coated on a substrate in a thickness of about 2 μm and formed in film. The substrate was arranged at inclined angles of 0, 10, 20, 30, 40, 50, 60 and 70 degrees with a horizontal plane and the substrate was irradiated with a ultraviolet ray converted into linear polarized light by using a Glan-Taylor prism at room temperature in a direction perpendicular to the horizontal plane at each angle at each intensity of 10 mJ/cm$^2$. Also, the same polarized ultraviolet ray irradiated to the opposite surface or the backface side of the substrate at the same angles at each intensity of 20 mJ/cm$^2$. Subsequently, the substrate was heated to 100° C. and then cooled to room temperature. When the retardation of this substrate was measured, the retardation was 0.3 μm at each angle of molecular inclination, namely, at 0, 5, 10, 15, 20, 25 and 30 degrees, which well coincided with the value calculated in the case of laminating films having a retardation of 0.08 μm each. The measured values and the calculated values are as shown in FIG. 6.

Figure 7:
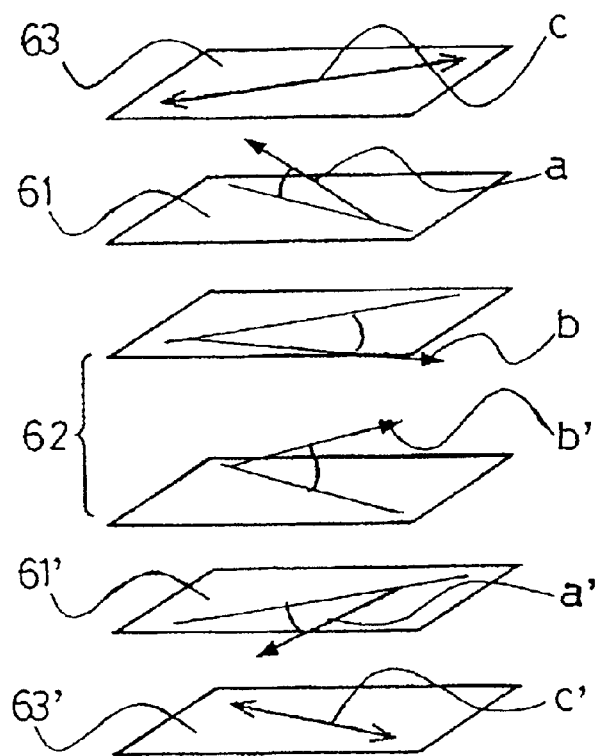
FIG. 7 is a conceptional view showing an optical system when evaluating the viewing angle characteristics of a retardation film obtained in a production process according to a second aspect of the present invention.

After the polarized sheets of a liquid crystal color television EV-510 manufactured by Casio Corporation was peeled off, two of these substrates obtained in this manner were applied to the liquid crystal cell such that the both are either disposed on the upper and lower sides of the liquid crystal cell respectively or overlapped on the upper side or lower side of the liquid crystal cell. Next, a polarized sheet (HEG1425DU, manufactured by Nitto Denko Corporation) was applied to each of the upper and lower sides. The axis of each optical element was arranged as shown in FIG. 7. In FIG. 7, the reference signs 61 and 61' respectively represent the substrate, the reference signs a and a' respectively show the direction of the inclination of each index ellipsoid, the reference sign 62 represents the liquid crystal cell, the reference signs b and b' respectively represent the direction of each pre-tilt, the reference signs 63 and 63' respectively represent each polarized sheet and the reference signs c and c' respectively show the direction of each photoabsorption axis.

The liquid crystal color television having such a structure was driven. Then, an angle at which the ratio of a contrast of white display to a contrast of black display was 5 was defined as a viewing angle and each viewing angle in upper, lower, left and right directions was measured. To measure the contrast ratio, BM-5A manufactured by Topcon Corporation was used. The results are shown in Table 2.

TABLE 2

| Film | Viewing angle (°) | | | |
| --- | --- | --- | --- | --- |
| | Upper | Lower | Left | Right |
| Examples | 5 | 47 | 65 | 58 |
| Comparisons (only polarized sheet) | 5 | 20 | 40 | 33 |

This Table 2 clearly indicates that each viewing angle in the lower, left and right directions is enlarged in the retardation film obtained in the second production process.

In this second production process, the film in which birefringence (retardation) is produced by exposure is further irradiated with a ultraviolet ray to promote a photoreaction of the unreacted photosensitive group, whereby orientation in the film is fixed firmly. Such a retardation film is superior in heat resistance and photo-stability and is therefore a practically valuable product.

Next, a third production process according to the present invention will be explained.

In this third production process, also the same materials as in the aforementioned first production process are used as the raw materials of a retardation film.

A mixture of the aforementioned photosensitive polymer and low molecular weight compound is formed in film by coating the mixture on a substrate. As the substrate, a uniaxial index ellipsoid layer or/and a biaxial index ellipsoid layer may be used. Examples of the uniaxis index ellipsoid layer or/and biaxial index ellipsoid layer include those obtained by uniaxial or biaxial stretching of a polymer material such as polycarbonate or triacetylcellulose and those obtained by developing a birefringence (retardation) by irradiating such a photosensitive material as used in the present invention with light, though not limited to these materials and any material having desired optical characteristics may be used.

In a first example of this third production process, a layer formed of the aforementioned photosensitive polymer or of a mixture of the aforementioned photosensitive polymer and low molecular weight compound was irradiated with linear polarized lights having electric field oscillation planes differing from each other in at least two directions, wherein the light to be irradiated in at least one direction is irradiated in a direction oblique to the direction of the normal line of the above layer.

Figure 9:
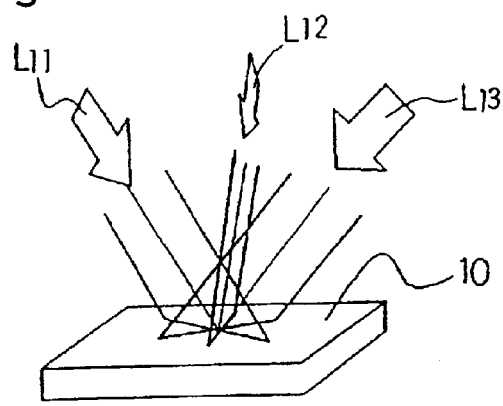
FIG. 9 is a conceptional view showing a first example of a production process according to a third aspect of the present invention.

Specifically, as shown in FIG. 9, a layer 10 formed of the photosensitive polymer or of the mixture of the photosensitive polymer and the low molecular weight compound is irradiated with, for example, linear polarized lights ($L_{11}$), ($L_{12}$) and ($L_{13}$) having electric field oscillation planes differing from each other in the same quantities in three specified directions.

Figure 10:
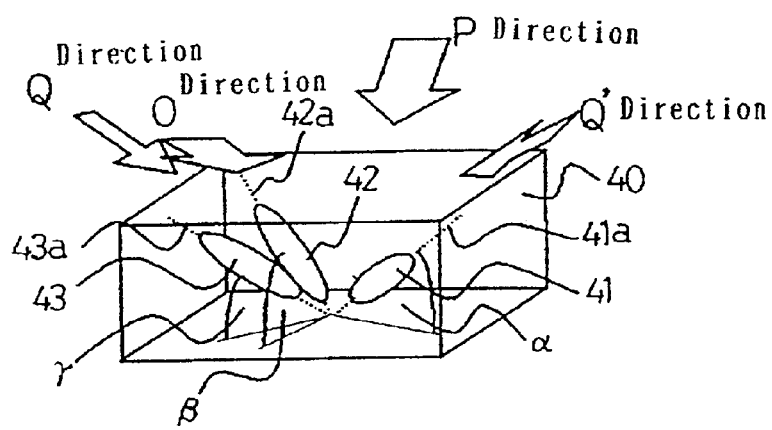
FIG. 10 is a schematic diagram showing an index ellipsoid of a retardation film obtained in a production process shown in FIG. 9.

In FIG. 10, when light passes through a layer 40 in which index ellipsoids 41, 42 and 43 are intermingled, a retardation given among linear polarized light components oscillating in the directions of the major axes perpendicular to each other is one obtained by composing retardations given by these index ellipsoids respectively.

In the case of the arrangement as shown in FIG. 10, there is no retardation in the plane. When light passes in the O direction, the refractive index of an index ellipsoid composed from three index ellipsoids is as follows: refractive index in the direction parallel to the plane was larger than refractive index in the direction perpendicular to the plane. On the contrary, when light passes in the P direction, the refractive index of an index ellipsoid composed from three index ellipsoids is as follows: refractive index in the direction parallel to the plane was smaller than refractive index in the direction perpendicular to the plane.

Also, when light passes in the Q and Q' directions, the refractive index of an index ellipsoid composed from three index ellipsoids differs depending upon the angles α, β and γ of the inclinations of the major axes 41a, 42a and 43a of the index ellipsoids 41, 42 and 43 respectively. The optical characteristics of such a retardation film (optical anisotropic element) should be designed based on the optical characteristics of a liquid crystal display on which the retardation film is mounted. Also, for the optical compensation of a liquid crystal display, it is required to regulate the retardation of the optical anisotropic element in consideration of the retardation of a whole optical system constituting the device including a polarizing plate.

As raw materials to be used in the third production process for the production of a retardation film, polymer (1) shown by the molecular structure 13 and low molecular weight compound (1) shown by the molecular structure 15 which were synthesized in the same manner as in the case of the first production process were used.

In the third production process, irradiation with light is carried out as shown in FIG. 8 in the same manner as in the second production process. Example 14 obtained when a retardation film having an inclined optical axis is produced in this manner is shown below.

EXAMPLE 14

(1) 3.75 wt % of the aforementioned polymer (1) and 1.25 wt % of the aforementioned low molecular weight compound (1) were dissolved in dichloroethane and the mixed solution was formed in film by coating it on a substrate in a thickness of about 2 µm.

(2) The aforementioned substrate provided with the formed layer was irradiated with a ultraviolet ray converted into linear polarized light by using a Glan-Taylor prism to the formed surface side (frontface side) and backface side of the substrate and in the direction inclined at 20 degrees with the direction of the normal line of the formed surface (substrate) at intensifies of 100 mJ/cm$^2$ and 200 mJ/cm$^2$ at a symmetric angle of 180 degrees.

(3) Next, the electric field oscillation plane of the ultraviolet ray to be irradiated was turned by +60 degrees around the axis of the direction of the irradiation and the aforementioned substrate provided with the formed layer was irradiated with the ultraviolet ray converted into linear polarized light by using a Glan-Taylor prism to the formed surface side and backface side (substrate side) of the substrate and in the direction inclined at 20 degrees with the direction of the normal line of the formed surface (substrate) at intensities of 100 mJ/cm$^2$ and 200 mJ/cm$^2$ at a symmetric angle of 180 degrees respectively.

(4) Subsequently, the electric field oscillation plane of the ultraviolet ray to be irradiated was turned by −120 degrees around the axis of the direction of the irradiation and the aforementioned substrate provided with the formed layer was irradiated with the ultraviolet ray converted into linear polarized light by using a Glan-Taylor prism to the film forming surface side and backface side (substrate side) of the substrate and in the direction inclined at 20 degrees with the direction of the normal line of the formed surface (substrate) at intensities of 100 mJ/cm$^2$ and 200 mJ/cm$^2$ at a symmetric angle of 180 degrees respectively.

(5) Subsequently, the irradiated substrate (with formed film) was heated to 100° C. and then cooled to room temperature.

The angle dependency of the retardation of the film produced in this manner is as follows, for example, in the case of setting the arrangement as shown in FIG. 10. When light passed in the O direction (incident angle: 50 degrees with the normal line of the substrate), the refractive index in the direction parallel to the plane was larger than the refractive index in the direction perpendicular to the plane and the retardation was 60 nm. When light passed in the P direction (incident angle: 50 degrees with the normal line of the substrate), the refractive index in the direction parallel to the plane was smaller than the refractive index in the direction perpendicular to the plane and the retardation was 10 nm. When light passed in the Q and Q' directions (incident angle: 50 degrees with the normal line of the substrate), the refractive index in the direction parallel to the plane was larger than the refractive index in the direction perpendicular to the plane and the retardation was 10 nm or smaller.

Figure 11:
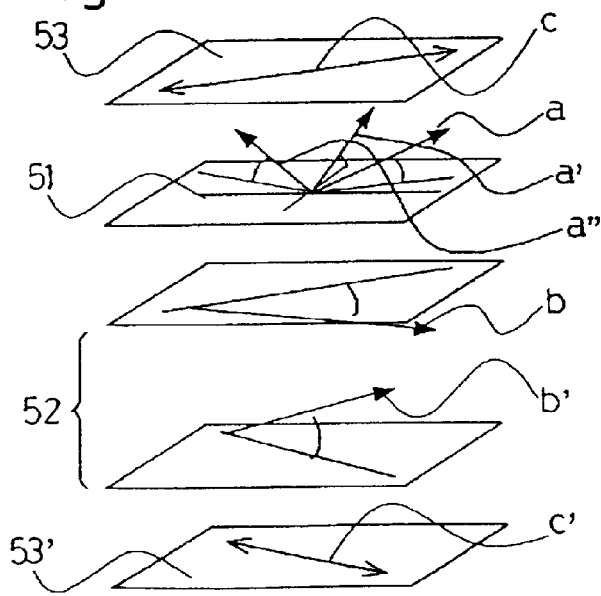
FIG. 11 is a conceptional view showing an optical system when evaluating the viewing angle characteristics of a retardation film obtained in a production process shown in FIG. 9.

After the polarized sheets of a liquid crystal color television EV-510 manufactured by Casio Corporation was peeled off, one of the obtained substrates was applied to the upper side or lower side of the liquid crystal cell. Next, a polarized sheet (HEG 1425DU, manufactured by Nitto Denko Corporation) was applied to each of the upper and lower sides. The axis of each optical element was arranged as shown in FIG. 11. In FIG. 11, the reference sign 51 represents a substrate, the reference signs a, a' and a" respectively show the direction of the inclination of each index ellipsoid, the reference sign 52 represents the liquid crystal cell, the reference signs b and b' respectively represent the direction of each pre-tilt, the reference signs 53 and 53' respectively represent a polarized sheet and the reference signs c and c' respectively show the direction of each photoabsorption axis.

The liquid crystal color television having such a structure was driven. Then, an angle at which the ratio of a contrast of white display to a contrast of black display attained the value of 5 was defined as a viewing angle and each viewing angle in upper, lower, left and right directions was measured. To measure the contrast ratio, BM-5A manufactured by Topcon Corporation was used. The results are shown in Table 3.

TABLE 3

| | Viewing angle (°) | | | |
| --- | --- | --- | --- | --- |
| Film | Upper | Lower | Left | Right |
| Examples | 15 | 43 | 60 | 51 |
| Comparisons (only polarized sheet) | 5 | 20 | 40 | 33 |

This Table 3 clearly indicates that each viewing angle in the upper, lower, left and right directions is enlarged in the retardation film obtained in the third production process.

In this third production process, the film in which birefringence (retardation) is produced by exposure is further irradiated with a ultraviolet ray to promote a photo-reaction of the unreacted photosensitive group, whereby orientation in the layer can be fixed firmly. Such a retardation film is superior in heat resistance and photo-stability and is therefore a practically valuable product.

Next, a fourth production process according to the present invention will be explained.

In this fourth production process, the same materials that are exemplified in the aforementioned first production process are used as the raw materials of a retardation film.

In this fourth production process, a layer comprising a photosensitive polymer having a positive-index-ellipsoid structure or a mixture of the polymer and a low molecular weight compound is irradiated with non-polarized light or light in which a perfectly polarized light component and a non-polarized light component are intermingled to control the birefringence.

Figure 12:
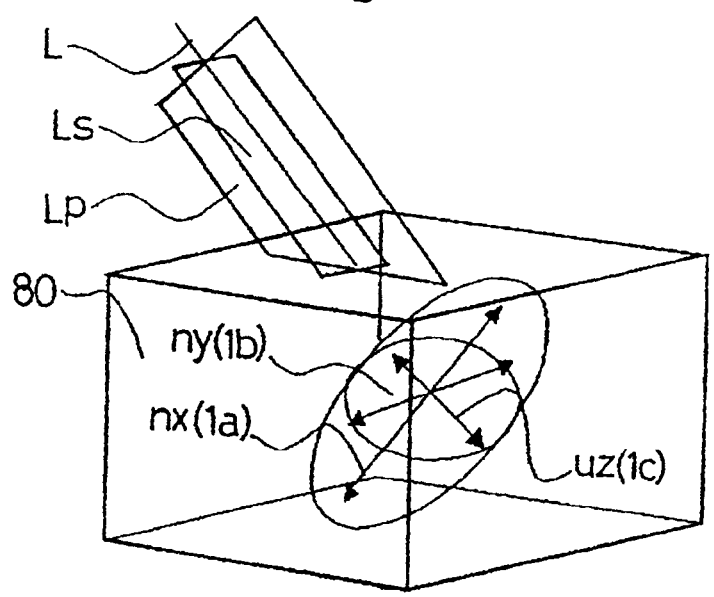
FIG. 12 is a conceptional view showing a production process according to a fourth aspect of the present invention.

Specifically, as shown in FIG. 12, the layer 80 comprising the photosensitive polymer having a positive-index-ellipsoid structure or the mixture of the polymer and the low molecular weight compound is irradiated with non-polarized light or light (L) in which a perfectly polarized light component and a non-polarized light component comprising P component ($L_p$) and S component ($L_s$) are intermingled. A retardation film is thus produced in which the birefringence or three primary refractive indexes nx (1a), ny (1b) and nz (1c) of the index ellipsoid in the layer and the inclination of the nx axis with the normal line of the layer surface are controlled.

Here, the term "to control the birefringence" means a step for developing the same birefringence as in the case of a bend-oriented or slant-oriented index ellipsoid or in the case of combining the index ellipsoid with a non-slanted uniaxial index ellipsoid.

Orientation due to a molecular motion after non-polarized light or a ultraviolet ray in which a perfectly polarized light component and a non-polarized light component are intermingled is irradiated is promoted by heating the layer.

The heating temperature of the layer is desirably lower than the softening point of the photo-reacted portion and higher than each softening point of the unreacted side chain and low molecule. Also, in order to promote the orientation of the layer, it is effective to irradiate a ultraviolet ray in which a perfectly polarized light component and a non-polarized light component are intermingled under heating (from room temperature up to Ti+5° C.). Here, Ti is a phase transition temperature at which the phase is changed from a liquid crystalline phase to an isotropic phase. It is effective to irradiate a ultraviolet ray in which a perfectly polarized light component and a non-polarized light component are intermingled at around Ti. When the layer obtained either by heating after a ultraviolet ray in which a perfectly polarized light component and a non-polarized light component are intermingled is irradiated or by a ultraviolet ray in which a perfectly polarized light component and a non-polarized light component are intermingled is irradiated under heating is cooled to lower than the softening point of the polymer, the molecule is frozen, thereby obtaining a retardation film.

In this fourth production process, also, in the case where the low molecular weight compound to be mixed with the photosensitive polymer has heat- or photo-reactivity among the low molecular weight compounds or to the polymer, the orientation is firmly fixed and an improvement in heat resistance is therefore expected. In this case, it is necessary to control the density of photo-reaction points by limiting the quantity of exposure or controlling the reactivity so as not to prevent molecular motion during reorientation.

In this fourth production process, irradiation with light is also carried out as shown in FIG. 8 in the same manner as in the second production process. Examples 15 to 24 are examples wherein a retardation film in which the birefringence or three primary refractive indexes nx, ny and nz of the index ellipsoid in the layer and the inclination of the nx axis with the normal line of the layer are controlled.

EXAMPLE 15

3.75 wt % of poly(4-methacryloyloxyhexyloxy-4'-cinnamoyloxyethyloxybiphenyl) and 1.25 wt % of 4,4'-bis (isobutyloxyhexyloxy)biphenyl were dissolved in dichloroethane and the mixture was coated on a glass substrate in a thickness of about 1.5 $\mu$m.

The substrate was disposed at an inclined angle of 45 degrees and irradiated with a ultraviolet ray of the degree of polarization: (P–S)/(P+S) being 15.6(%) (P and S are the strengths of the transmitted light of the P component and S component respectively, the strength of the perfectly polarized light component is shown by P–S and P+S is a strength of all transmitted light including the perfectly polarized light component and non-polarized light component) at room temperature in a direction perpendicular to a horizontal plane and to both of opposite principal surfaces of the substrate at each intensity of 500 mJ/cm². Then the substrate was heated to 100° C. and then cooled to room temperature. Subsequently, the substrate was irradiated with a non-polarized ultraviolet ray at an intensity of 1 J/cm² to promote a reaction of the unreacted photosensitive group thereby making the orientation film.

The index ellipsoid of the substrate obtained in this manner had the characteristics that the ratios of three primary refractive indexes were as follows: nx=1.6, ny=1.5 and nz=1.5, and was substantially equal to one obtained by combining an index ellipsoid in which the nx axis was bend-oriented at an angle of 0 to 90 degrees with the direction of the normal line of the substrate surface with a uniaxially oriented film in which the ratios of three primary refractive indexes were as follows: nx=1.6, ny=1.5 and nz=1.5.

EXAMPLE 16

3.75 wt % of poly(4-methacryloyloxyhexyloxy-4'-cinnamoyloxyethyloxybiphenyl) and 1.25 wt % of 4,4'-bis (isobutyryloxyhexyloxy)biphenyl were dissolved in dichloroethane and the mixture was coated on a glass substrate in a thickness of about 1.5 $\mu$m.

The substrate was disposed at inclined angle of 45 degrees and irradiated with a ultraviolet ray of the degree of polarization being –15.6(%) at room temperature in a direction perpendicular to a horizontal plane and to both of opposite principal surfaces of the substrate at each intensity of 500 mJ/cm². The substrate was heated to 100° C. and then cooled to room temperature. Subsequently, the substrate was irradiated with a non-polarized ultraviolet ray at an intensity of 1 J/cm² to promote a reaction of the unreacted photosensitive group thereby making the orientation firm.

The index ellipsoid of the substrate obtained in this manner had the characteristics that the ratios of three primary refractive indexes were as follows: nx=1.55, ny=1.6 and nz=1.5 and the nx axis was inclined at an angle of 45 degrees with the direction of the normal line of the substrate surface.

EXAMPLE 17

3.75 wt % of poly(4-methacryloyloxyhexyloxy, 4'-cinnamoyloxyethyloxybiphenyl) and 1.25 wt % of 4,4'-bis(isobutyryloxyhexyloxy)biphenyl were dissolved in dichloroethane and the mixture was coated on a glass substrate in a thickness of about 1.5 $\mu$m.

The substrate was disposed at an inclined angle of 45 degrees and irradiated with a ultraviolet ray of the degree of polarization: (P–S)/(P+S) being 7.9 (%) at room temperature in a direction perpendicular to a horizontal plane and to both of opposite principal surfaces of the substrate at each intensity of 500 mJ/cm². The substrate was heated to 100° C. and then cooled to room temperature. Subsequently, the substrate was irradiated with a non-polarized ultraviolet ray at an intensity of 1 J/cm² to promote a reaction of the unreacted photosensitive group thereby making the orientation firm.

The index ellipsoid of the substrate obtained in this manner had the characteristics that the ratios of three primary refractive indexes were as follows: nx=1.65, ny=1.51 and nz=1.5, which were substantially equal to the case of an index ellipsoid in which the nx axis was bend-oriented at 0 to 40 degrees with the direction of the normal line of the substrate surface.

EXAMPLE 18

3.75 wt % of poly(4-methacryloyloxyhexyloxy-4'-cinnamoyloxyethyloxybiphenyl) and 1.25 wt % of 4,4'-bis(isobutyryloxyhexyloxy)biphenyl were dissolved in dichloroethane and the mixture was coated on a glass substrate in a thickness of about 1.5 $\mu$m.

The substrate was disposed at an inclined angle of 45 degrees and irradiated with a ultraviolet ray of the degree of polarization being −7.9(%) at room temperature in a direction perpendicular to a horizontal plane and to both of opposite principal surfaces of the substrate at each intensity of 500 mJ/cm$^2$. The substrate was heated to 100° C. and then cooled to room temperature. Subsequently, the substrate was irradiated with a non-polarized ultraviolet ray at an intensity of 1 J/cm$^2$ to promote a reaction of the unreacted photosensitive group thereby making the orientation firm.

The index ellipsoid of the substrate obtained in this manner had the characteristics that the ratios of three primary refractive indexes were as follows: nx=1.6, ny=1.54 and nz=1.5 and the nx axis was inclined at an angle of 25 degrees with the direction of the normal line of the substrate surface.

EXAMPLE 19

3.75 wt % of poly(4-methacryloyloxyhexyloxy-4'-cinnamoyloxyethyloxybiphenyl) and 1.25 wt % of 4,4'-bis(isobutyryloxyhexyloxy)biphenyl were dissolved in dichloroethane and the mixture was coated on a glass substrate in a thickness of about 1.5 $\mu$m.

The substrate was disposed at an inclined angle of 45 degrees and irradiated with a non-polarized ultraviolet ray (degree of polarization=0(%)) at room temperature in a direction perpendicular to a horizontal plane and to both of opposite principal surfaces of the substrate at each intensity of 500 mJ/cm$^2$. The substrate was heated to 100° C. and then cooled to room temperature. Subsequently, the substrate was irradiated with a non-polarized ultraviolet ray at an intensity of 1 J/cm$^2$ to promote a reaction of the unreacted photosensitive group thereby making the orientation firm.

The index ellipsoid of the substrate obtained in this manner had the characteristics that the ratios of three primary refractive indexes were as follows: nx=1.6, ny=1.53 and nz=1.5 and the nx axis was inclined at an angle of 55 degrees with the direction of the normal line of the substrate surface. The optical axis of this index ellipsoid formed an angle of almost 0 degree with the normal line of the surface of the retardation film.

EXAMPLE 20

3.75 wt % of poly(4-methacryloyloxyhexyloxy-4'-cinnamoyloxyethyloxybiphenyl) and 1.25 wt % of 4-pentyl-4'-cyanobiphenyl were dissolved in dichloroethane and the mixture was coated on a glass substrate in a thickness of about 1.5 $\mu$m.

The substrate was disposed at an inclined angle of 45 degrees and irradiated with a ultraviolet ray of the degree of polarization: (P−S)/(P+S) being 15.6(%) at room temperature in a direction perpendicular to a horizontal plane and to both of opposite principal surfaces of the substrate at each intensity of 500 mJ/cm$^2$. The substrate was heated to 100° C. and then cooled to room temperature. Subsequently, the substrate was irradiated with a non-polarized ultraviolet ray at an intensity of 1 J/cm$^2$ to promote a reaction of the unreacted photosensitive group thereby making the orientation firm.

As to the birefringence of the substrate obtained in this manner, the ratios of three primary refractive indexes were as follows: nx=1.6, ny=1.5 and nz=1.5, and the substrate was substantially equal to one obtained by combining an index ellipsoid in which the nx axis was bend-oriented at an angle of 50 to 90 degrees with the direction of the normal line of the substrate surface with a uniaxially oriented film in which the ratios of three primary refractive indexes were as follows: nx=1.6, ny=1.5 and nz=1.5, and the nx axis was inclined at an angle of 0 degree with the direction of the normal line of the substrate surface.

EXAMPLE 21

3.75 wt % of poly(4-methacryloyloxyhexyloxy-4'-cinnamoyloxyethyloxybiphenyl) and 1.25 wt % of 4-pentyl-4'-cyanobiphenyl were dissolved in dichloroethane and the mixture was coated on a glass substrate in a thickness of about 1.5 $\mu$m.

The substrate was disposed at an inclined angle of 45 degrees and irradiated with a ultraviolet ray of the degree of polarization being −15.6(%) at room temperature in a direction perpendicular to a horizontal plane and to both of opposite principal surfaces of the substrate at each intensity of 500 mJ/cm$^2$. The substrate was heated to 100° C. and then cooled to room temperature. Subsequently, the substrate was irradiated with a non-polarized ultraviolet ray at an intensity of 1 J/cm$^2$ to promote a reaction of the unreacted photosensitive group thereby making the orientation firm.

The index ellipsoid of the substrate obtained in this manner had the characteristics that the ratios of three primary refractive indexes were as follows: nx=1.6, ny=1.59 and nz=1.5 and the nx axis was inclined at an angle of 37 degrees with the direction of the normal line of the substrate surface.

EXAMPLE 22

3.75 wt % of poly(4-methacryloyloxyhexyloxy-4'-cinnamoyloxyethyloxybiphenyl) and 1.25 wt % of 4-pentyl-4'-cyanobiphenyl were dissolved in dichloroethane and the mixture was coated on a glass substrate in a thickness of about 1.5 $\mu$m.

The substrate was disposed at an inclined angle of 45 degrees and irradiated with a ultraviolet ray of the degree of polarization: (P−S)/(P+S) being 7.9(%) at room temperature in a direction perpendicular to a horizontal plane and to both of opposite principal surfaces of the substrate at each intensity of 500 mJ/cm$^2$. The substrate was heated to 100° C. and then cooled to room temperature. Subsequently, the substrate was irradiated with a non-polarized ultraviolet ray at an intensity of 1 J/cm$^2$ to promote a reaction of the unreacted photosensitive group thereby making the orientation firm.

As to the birefringence of the substrate obtained in this manner, the ratios of three primary refractive indexes were as follows: nx=1.58, ny=1.5 and nz=1.5, and the birefringence of the substrate was substantially equal to that of an index ellipsoid in which the nx axis was bend-oriented at an angle of 0 to 30 degrees with the direction of the normal line of the substrate surface.

EXAMPLE 23

3.75 wt % of poly(4-methacryloyloxyhexyloxy-4'-cinnamoyloxyethyloxybiphenyl) and 1.25 wt % of 4-pentyl- 4'-cyanobiphenyl were dissolved in dichloroethane and the mixture was coated on a glass substrate in a thickness of about 1.5 μm.

The substrate was disposed at an inclined angle of 45 degrees and irradiated with a ultraviolet ray of the degree of polarization: (P−S)/(P+S) being 7.9(%) at room temperature in a direction perpendicular to a horizontal plane and to both of opposite principal surfaces of the substrate at each intensity of 500 mJ/cm$^2$. The substrate was heated to 100° C. and then cooled to room temperature. Subsequently, the substrate was irradiated with a non-polarized ultraviolet ray at an intensity of 1 J/cm$^2$ to promote a reaction of the unreacted photosensitive group thereby making the orientation firm.

As to the birefringence of the substrate obtained in this manner, the ratios of three primary refractive indexes were as follows: nx=1.58, ny=1.56 and nz=1.5, and the substrate was substantially equal to one obtained by combining an index ellipsoid in which the nx axis was bend-oriented at an angle of 0 to 90 degrees with the direction of the normal line of the substrate surface with a uniaxially oriented layer in which the ratios of three primary refractive indexes were as follows: nx=1.55, ny=1.5 and nz=1.5, and the nx axis is inclined at an angle of 0 degree with the direction of the normal line of the substrate surface.

EXAMPLE 24

3.75 wt % of poly(4-methacryloyloxyhexyloxy-4'-cinnamoyloxyethyloxybiphenyl) and 1.25 wt % of 4-pentyl-4'-cyanobiphenyl were dissolved in dichloroethane and the mixture was coated on a glass substrate in a thickness of about 1.5 μm.

The substrate was disposed at an inclined angle of 45 degrees and irradiated with a non-polarized ultraviolet ray (degree of polarization=0(%)) at room temperature in a direction perpendicular to a horizontal plane and to both of opposite principal surfaces of the substrate at each intensity of 500 mJ/cm$^2$. The substrate was heated to 100° C. and then cooled to room temperature. Subsequently, the substrate was irradiated with a non-polarized ultraviolet ray at an intensity of 1 J/cm$^2$ to promote a reaction of the unreacted photosensitive group thereby making the orientation firm.

As to the birefringence of the substrate obtained in this manner, the ratios of three primary refractive indexes were as follows: nx=1.6, ny=1.53 and nz=1.5, and the substrate was substantially equal to one obtained by combining an index ellipsoid in which the nx axis was inclined at an angle of 30 degrees with the direction of the normal line of the substrate surface with a uniaxially oriented layer in which the ratios of three primary refractive indexes were as follows: nx=1.6, ny=1.5 and nz=1.5, and the nx axis was inclined at an angle of 0 degree with the direction of the normal line of the substrate surface.

Method of Evaluation

The same coating layer as in Example 19 was formed by coating on a TAC film having a retardation of 40 nm in the direction inclined at an angle of 40 degrees with the direction of the normal line of the principal plane of the layer. In addition, after the polarized sheets of a liquid crystal color television EV-510 manufactured by Casio Corporation were peeled off, a retardation film obtained by laminating the TAC film and a layer in which a biaxial index ellipsoid was inclined was applied to the upper side or lower side of the liquid crystal cell. Next, a polarized sheet (HEG1425DU, manufactured by Nitto Denko Corporation) was applied to each of the upper and lower sides. The axis of each optical element was arranged as shown in FIG. 13.

Figure 13:
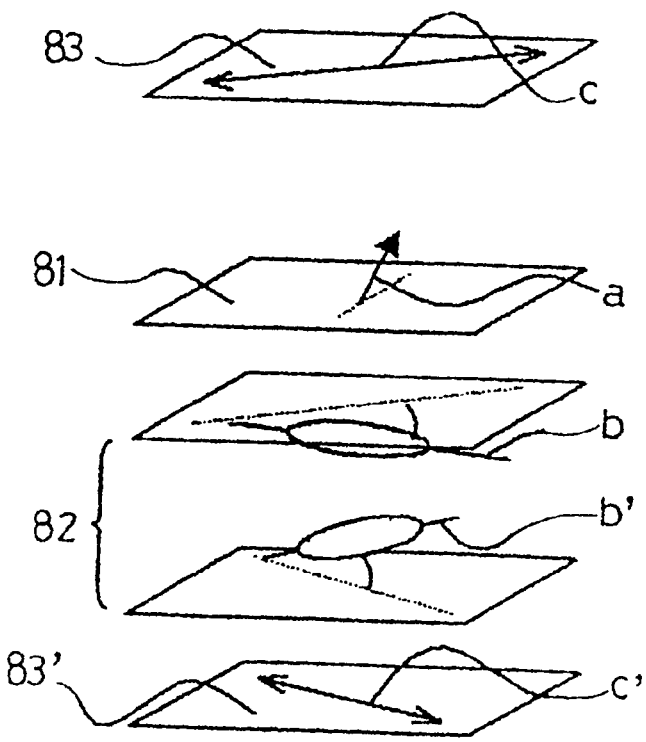
FIG. 13 is a conceptional view showing an optical system when evaluating the viewing angle characteristics of a retardation film obtained in a production process according to a fourth aspect of the present invention.

In FIG. 13, the reference sign 81 represents the retardation film obtained by the fourth production process, the reference sign a show the direction of the inclination of the nx axis of an index ellipsoid, the reference sign 82 represents the liquid crystal cell, the reference signs b and b' respectively represent the direction of each pre-tilt, the reference signs 83 and 83' respectively represent each polarized sheet and the reference signs c and c' respectively show the direction of each photoabsorption axis.

The liquid crystal color television having such a structure was driven. Then, an angle at which the ratio of a contrast of white display to a contrast of black display was attained the value of 5 was defined as a viewing angle and each viewing angle in upper, lower, left and night directions was measured. To measure the contrast ratio, BM-5A manufactured by Topcon Corporation was used. The results are shown in Table 4.

TABLE 4

| Film | Viewing angle (°) | | | |
|---|---|---|---|---|
| | Upper | Lower | Left | Right |
| Examples | 8 | 48 | 55 | 50 |
| Comparisons (only polarized sheet) | 5 | 20 | 40 | 33 |

This Table 4 clearly indicates that each viewing angle in the upper, lower, left and right directions is enlarged in the retardation film obtained in the fourth production process and the viewing angle can be enlarged by only one retardation film when the film is mounted on a liquid crystal display.

Next, a second example of the third production process according to the present invention will be explained.

In this second example of the third production process, the same materials that are exemplified in the aforementioned first production process are used as the raw materials of a retardation film.

Figure 14:
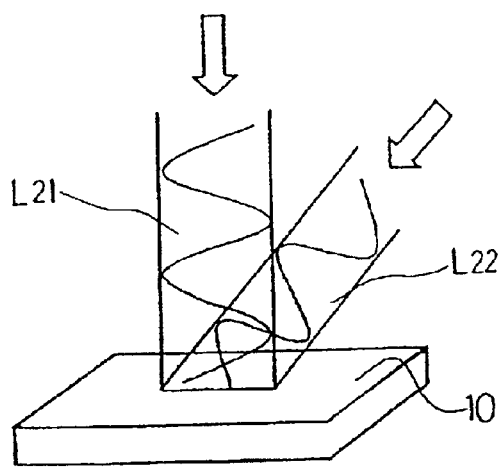
FIG. 14 is a conceptional view showing a second example of a production process according to the third aspect of the present invention.

In addition, in this second example of the third production process, as shown in FIG. 14, a layer 10 formed of a photosensitive polymer or of a mixture of a photosensitive polymer and a low molecular weight compound is irradiated with linear polarized light ($L_{22}$) in a direction oblique to the direction of the normal line of the aforementioned film and also with linear polarized light ($L_{21}$) having an electric field oscillating plane orthogonal to that of the linear polarized light ($L_{22}$) in the direction of the normal line of the layer.

Figure 15:
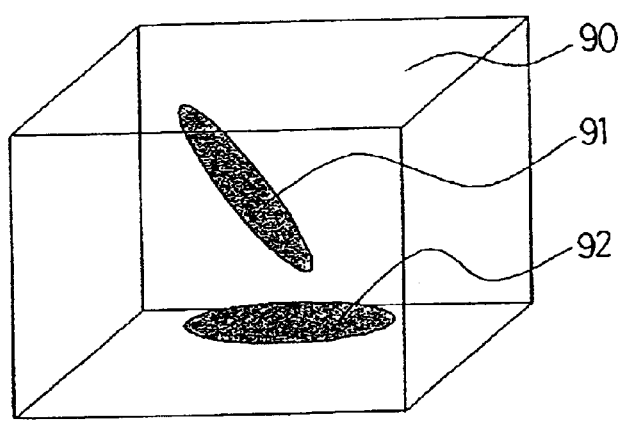
FIG. 15 is a schematic diagram showing an index ellipsoid of a retardation film obtained in a production process shown in FIG. 14.

In the retardation film obtained in this manner, an index ellipsoid 91 oriented in an oblique direction and an index ellipsoid 92 oriented in a horizontal direction are intermingled as shown in FIG. 15. When light passes through a layer 90 in which index ellipsoids are intermingled in this manner, a retardation given among linear polarized light components oscillating in the directions of the major axes perpendicular to each other is one obtained by composing retardations given by these index ellipsoids respectively.

The aforementioned retardation film is used for a liquid crystal display, in which two retardation films are arranged on the upper and lower sides of a liquid crystal cell such that the optical isotropic axes are made orthogonal to each other. The concept at this time will be explained with reference to FIG. 16.

Figure 16:
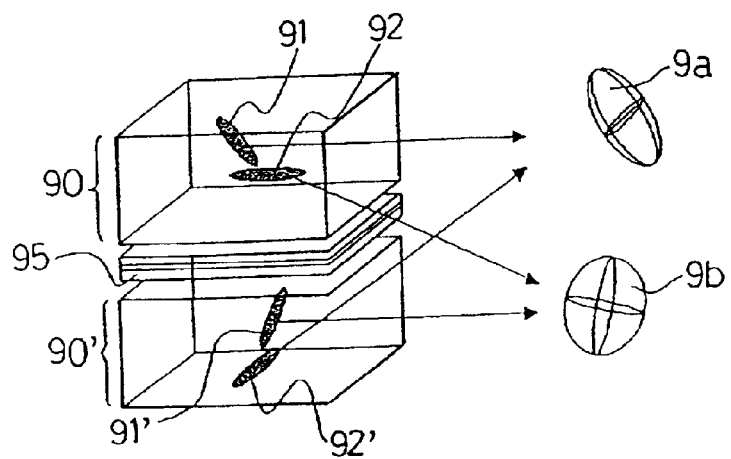
FIG. 16 is a schematic diagram showing an example of a combination of a retardation film obtained in a production process shown in FIG. 14.

In FIG. 16, in the case of combining the index ellipsoid 91 which is obliquely oriented in the retardation film 90 disposed on the upper side with an index ellipsoid 91' which is horizontally oriented in a retardation film 90 on the lower side with a liquid crystal cell 95 sandwiched therebetween, two negative index ellipsoids 9a and 9b which have the effect of enlarging the viewing angle of the liquid crystal display are inclined to develop the same optical characteristics as in the case where the directions of these ellipsoids are orthogonal to each other.

At this time, if these index ellipsoids 92 and 92' components which are horizontally oriented are increased, the same optical characteristics as in the case of combining a layer having a negative index ellipsoid, which is inclined, with a uniaxial index ellipsoid layer or/and a biaxial index ellipsoid layer are eventually developed.

The optical characteristics of such a retardation film should be designed based on the optical characteristics of a liquid crystal display on which the retardation film is mounted. Also, for the optical compensation of a liquid crystal display, it is required to regulate the retardation of the optical anisotropic element in consideration of the retardation of a whole optical system constituting the device including a polarizing plate.

As raw materials of a retardation film to be used in this second example of the third production process, polymer (1) and low molecular weight compound (1) which were synthesized in the same manner as in the case of the first production process were used. Also, polymer (1) to be used in this second example was obtained by dissolving the aforementioned monomer (1) in tetrahydrofuran and adding AIBN (azobisisobutyronitrile) as a reaction initiator to polymerize the monomer. This polymer (1) exhibited liquid-crystallinity in a temperature range from 47 to 75° C.

In the second example of the third production process, irradiation with light is conducted as shown in FIG. 8 in the same manner as in the second production process. Example 25 obtained when a retardation film is produced in this manner is shown below.

EXAMPLE 25

3.75 wt % of the polymer (1) and 1.25 wt % of the low molecular weight compound (1) were dissolved in dichloroethane and the mixed solution was formed in film by coating it on a substrate (triacetyl cellulose film) in a thickness of about 4 $\mu$m. The substrate was arranged at an inclined angle of 45 degrees with a horizontal plane and the substrate was irradiated with a ultraviolet ray converted into linear polarized light by using a Glan-Taylor prism at room temperature in a direction perpendicular to the horizontal plane and to both of opposite principal surfaces of the substrate at each intensity of 100 mJ/cm$^2$ and 200 mJ/cm$^2$. The substrate was made level and irradiated with a ultraviolet ray converted into linear polarized light in the same manner at room temperature in a direction perpendicular to the horizontal plane and to both of opposite principal surfaces of the substrate at each intensity of 150 mJ/cm$^2$ and 300 mJ/cm$^2$. Subsequently, the substrate was heated to 100° C. and then cooled to room temperature.

Figure 17:
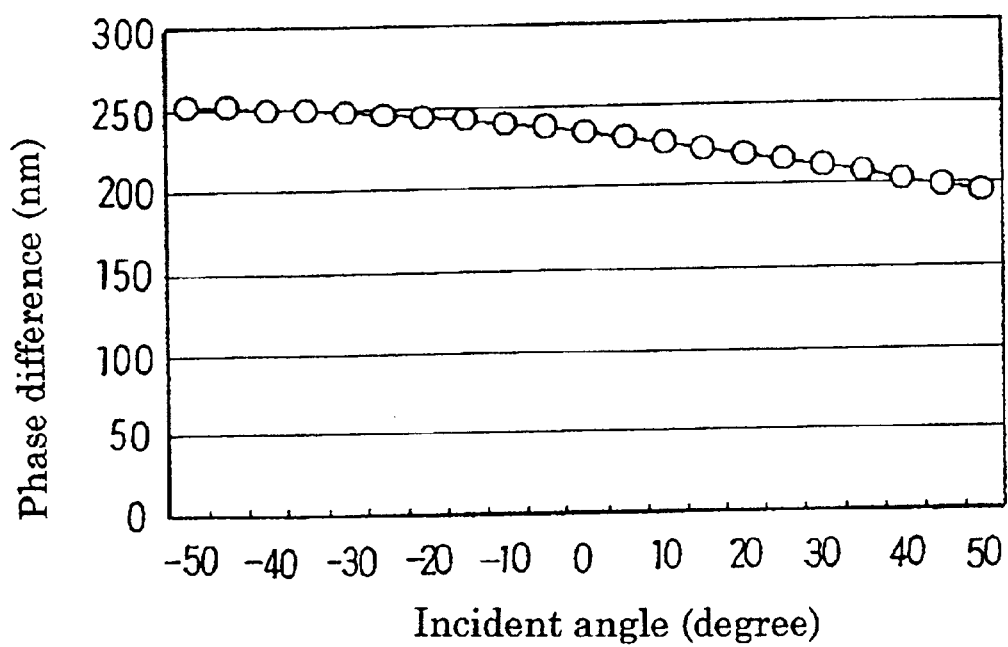
FIG. 17 is a graph showing the results of measurements of the retardation angle dependency of a retardation film obtained in a production process shown in FIG. 14.

The angle dependency of the retardation of the retardation film produced in this manner is as shown in FIG. 17.

After the polarized sheets of a liquid crystal color television EV-510 manufactured by Casio Corporation was peeled off, the obtained substrate was applied to each of the upper and lower sides of the liquid crystal cell or two substrates were overlapped and applied to the upper or lower side of the liquid crystal cell. Next, a polarized sheet (HEG1425DU, manufactured by Nitto Denko Corporation) was applied to each of the upper and lower sides. The axis of each optical element was arranged in the same manner as in the case of FIG. 7 shown in the second production process. The results are shown in Table 5.

TABLE 5

| Film | Viewing angle (°) | | | |
|---|---|---|---|---|
| | Upper | Lower | Left | Right |
| Examples | 5 | 43 | 55 | 50 |
| Comparisons (only polarized sheet) | 5 | 20 | 40 | 33 |

This Table 5 clearly indicates that each viewing angle in the upper, lower, left and right directions is enlarged in the retardation film obtained in the second example of the third production process.

Next, a third example of the third production process according to the present invention will be explained.

In this third example of the third production process, the same materials that are exemplified in the aforementioned first production process are used as the raw materials of a retardation film.

Figure 18:
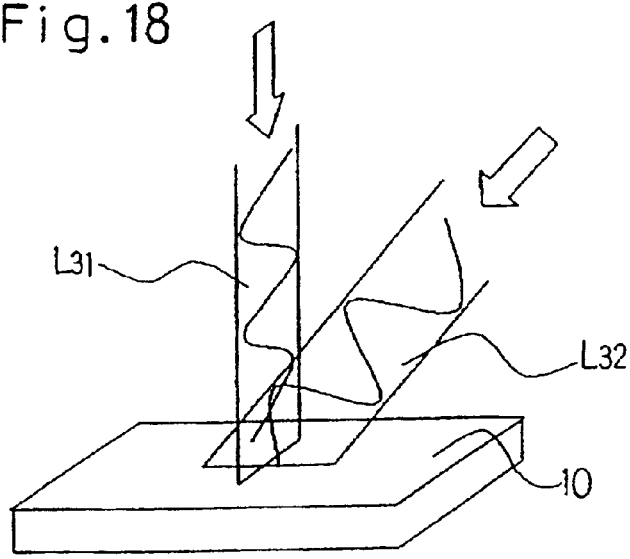
FIG. 18 is a conceptional view showing a third example of a production process according to the third aspect of the present invention.

In addition, in this third example of the third production process, as shown in FIG. 18, a layer 10 formed of a photosensitive polymer or of a mixture of a photosensitive polymer and a low molecular weight compound is irradiated with linear polarized light ($L_{32}$) in a direction oblique to the direction of the normal line of the aforementioned layer and also with linear polarized light ($L_{31}$) having an electric field oscillating plane orthogonal to that of the linear polarized light ($L_{32}$) in the direction of the normal line of the layer.

Figure 19:
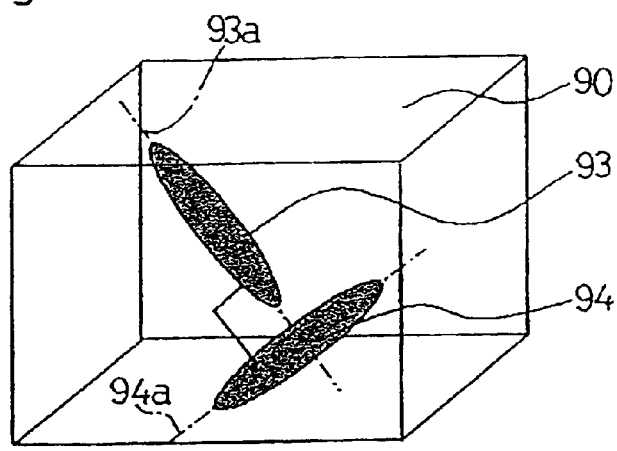
FIG. 19 is a schematic diagram showing an index ellipsoid of a retardation film obtained in the production process shown in FIG. 18.

In the retardation film obtained in this manner, the major axes 93a and 94a of index ellipsoids 93 and 94 respectively cross at right angle with each other and are intermingled as shown in FIG. 19. When light passes through a layer 90 in which index ellipsoids are intermingled, a retardation given among linear polarized light components oscillating in the directions of the major axes perpendicular to each other is one obtained by composing retardations given by these index ellipsoids respectively. From this, while controlling the quantity of the linear polarized light to be irradiated in an oblique direction and the quantity of the linear polarized light which has an electric field oscillation plane orthogonal to that of the above light and is irradiated in a vertical direction, the retardation film is made to have the same optical characteristics as in the case of slant-aligning an index ellipsoid having a negative birefringence. Also, if the index ellipsoid component which is horizontally oriented is increased, the same optical characteristics as in the case of combining a layer having a negative index ellipsoid, which is inclined, with a uniaxial index ellipsoid layer or/and a biaxial index ellipsoid layer are eventually developed.

As raw materials of a retardation film to be used in this third example of the third production process, the same materials that are exemplified in the first production process were used.

In the third example of the third production process, irradiation with light is carried out as shown in FIG. 8 in the same manner as in the second production process. Example 26 obtained when a retardation film is produced in this manner is shown below.

EXAMPLE 26

(1) 3.75 wt % of the polymer (1) and 1.25 wt % of the low molecular weight compound (1) were dissolved in dichloroethane and the mixed solution was formed in film by coating it on a substrate (triacetylcellulose film) in a thickness of about 4 $\mu$m.

(2) The formed layer side of the aforementioned formed film (layer) was irradiated (=oblique irradiation) with a ultraviolet ray converted into linear polarized light by using a Glan-Taylor prism in the direction inclined at 45 degrees with the direction of the normal line of the formed layer surface at an intensity of 100 mJ/cm² and subsequently, the formed layer surface side of the aforementioned layer-formed film was irradiated (=oblique irradiation) with the same ultraviolet ray at an intensity of 200 mJ/cm² at a symmetric angle of 180 degrees.

(3) In the next stage, the electric field oscillation plane of the ultraviolet ray to be irradiated was turned by 90 degrees around the axis of the direction of the irradiation and the formed layer surface side of the aforementioned film was irradiated (=irradiation in the direction of the normal line) with the same ultraviolet ray in the direction of the normal line of the formed layer surface at an intensity of 150 mJ/cm² and Subsequently, the formed layer surface side of the aforementioned layer-formed film was irradiated (=irradiation in the direction of the normal line) with the same ultraviolet ray at an intensity of 300 mJ/cm² at a symmetric angle of 180 degrees.

(4) Subsequently, the irradiated substrate was heated to 100° C. and then cooled to room temperature.

Figure 20:
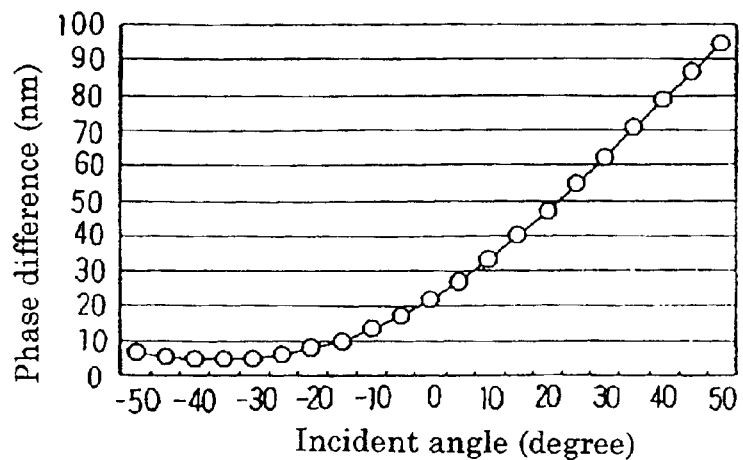
FIG. 20 is a graph showing the results of measurements of the retardation angle dependency of a retardation film obtained in the production process shown in FIG. 18.

The refractive index of the retardation film obtained in the above process is as follows: the refractive index in the direction of the electric field oscillation of the light which was obliquely irradiated was larger than the refractive index in the direction of the electric field oscillation of the light which was horizontally irradiated. The angle dependency of the retardation is as shown in FIG. 20.

After the polarized sheets of a liquid crystal color television EV-510 manufactured by Casio Corporation was peeled off, the obtained substrate was applied to each of the upper and lower sides of the liquid crystal cell or two substrates were overlapped and applied to the upper or lower side of the liquid crystal cell. Next, a polarized sheet (HEG1425DU, manufactured by Nitto Denko Corporation) was applied to each of the upper and lower sides. The structure of the arrangement of the axis of each optical element was designed to be the same as that shown in FIG. 7 shown in the second production process. The results are shown in Table 6.

TABLE 6

| Film | Viewing angle (°) | | | |
| --- | --- | --- | --- | --- |
| | Upper | Lower | Left | Right |
| Examples | 5 | 43 | 55 | 50 |
| Comparisons (only polarized sheet) | 5 | 20 | 40 | 33 |

This Table 6 clearly indicates that each viewing angle in the lower, left and right directions is enlarged in the retardation film obtained in the third example of the third production process.

Next, a fourth example of the third production process according to the present invention will be explained.

In this fourth example of the third production process, the same materials that are exemplified in the aforementioned first production process are also used as the raw materials of a retardation film.

Figure 21:
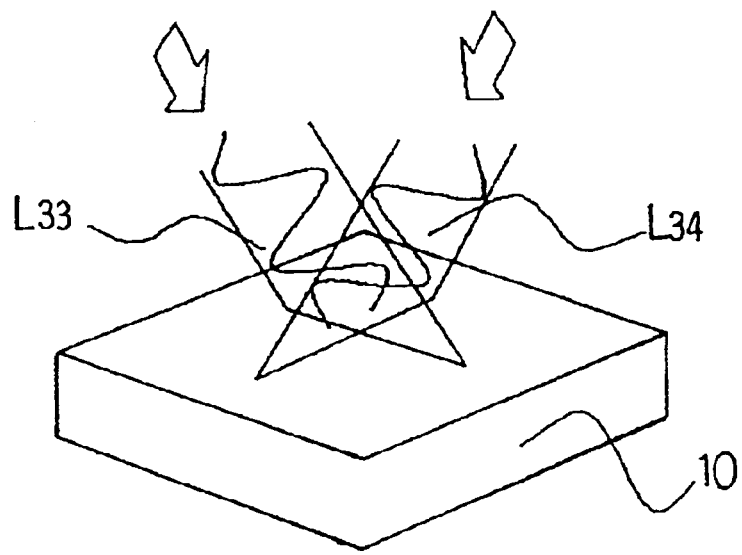
FIG. 21 is a conceptional view showing a fourth example of a production process according to the third aspect of the present invention.

In addition, in this fourth example of the third production process, as shown in FIG. 21, a layer 10 is irradiated with linear polarized lights ($L_{33}$) and ($L_{34}$) having electric field oscillation planes differing from each other in a direction oblique to the direction of the normal line of the aforementioned layer to thereby obtain a quite new retardation film in which the angle dependency of the retardation is optionally controlled.

Figure 22:
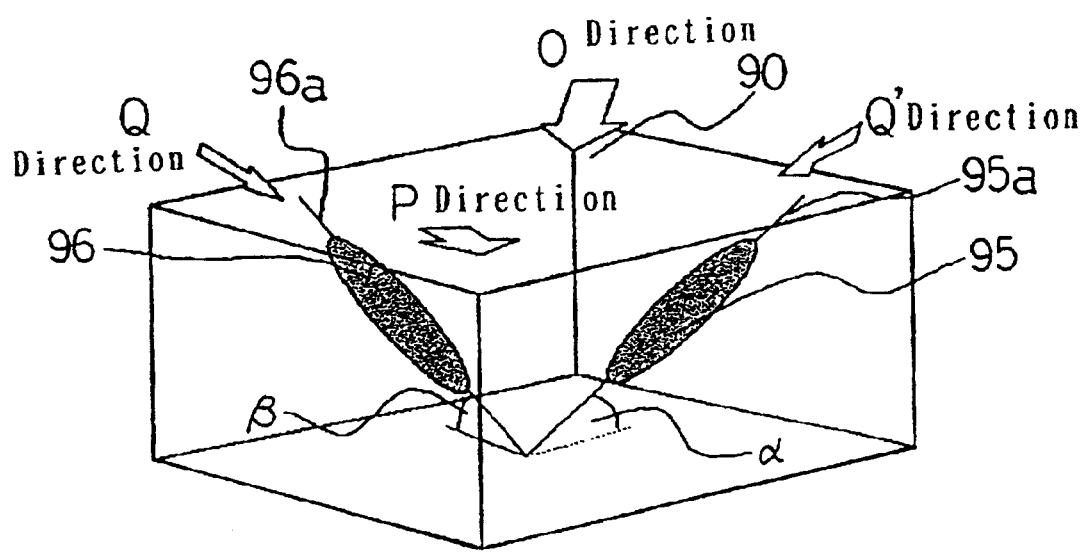
FIG. 22 is a schematic diagram showing an index ellipsoid of a retardation film obtained in the production process shown in FIG. 21.

In the retardation film obtained in this fourth example of the third production process, index ellipsoids 95 and 96 are intermingled as shown in FIG. 22. When light passes through a layer 90 in which index ellipsoids are intermingled, a retardation given among linear polarized light components oscillating in the directions of the major axes perpendicular to each other is one obtained by composing retardations given by these index ellipsoids respectively.

In the case of the arrangement as shown in FIG. 22, there is no retardation in the plane. When light passes in the O, P, Q and Q' directions, the direction in which the refractive indexes are made large differs depending on whether it is the direction parallel or perpendicular to the plane due to the angles α and β of the inclinations of the major axes 95a and 96a of the index ellipsoids 95 and 96 respectively in an index ellipsoid composed from two index ellipsoids.

The optical characteristics of such a retardation film should be designed based on the optical characteristics of a liquid crystal display on which the retardation film is mounted. Also, for the optical compensation of a liquid crystal display, it is required to regulate the retardation of optical anisotropic elements in consideration of the retardation of a whole optical system constituting the device including a polarizing plate.

The photosensitive polymer or the mixture of the photosensitive polymer and the low molecular weight compound is formed in film by coating it on a substrate. As the substrate, a uniaxial index ellipsoid layer or/and a biaxial index ellipsoid layer may be used. Examples of the uniaxis index ellipsoid layer or/and biaxial index ellipsoid layer include those obtained by uniaxial or biaxial stretching of a polymer material such as polycarbonate or triacetylcellulose and those obtained by developing a birefringence by irradiating such a photosensitive material as used in the present invention with light, though not limited to these materials and any material having desired optical characteristics may be used.

As raw materials of a retardation film to be used in this fourth example of the third production process, the same materials that are exemplified in the first production process were used.

In the fourth example of the third production process, irradiation with light is carried out as shown in FIG. 8 in the same manner as in the second production process. Example 27 obtained when a retardation film is produced in this manner is shown below.

EXAMPLE 27

(1) 3.75 wt % of the polymer (1) and 1.25 wt % of the low molecular weight compound (1) were dissolved in dichloroethane and the mixed solution was formed in film by coating it on a substrate (triacetyl cellulose film) in a thickness of about 4 μm.

(2) The formed layer side and backface side, or both of the opposite principal surfaces of the aforementioned layer-formed film were irradiated with a ultraviolet ray converted into linear polarized light by using a Glan-Taylor prism in the direction inclined at 20 degrees with the direction of the normal line of the film surface (formed-layer surface) at intensities of 100 mJ/cm² and 200 mJ/cm² respectively at a symmetric angle of 180 degrees.

(3) In the next stage, the substrate was turned by 90 degrees in the direction parallel to the film surface (formed-layer surface) while keeping the inclination of the ultraviolet ray to be irradiated at 20 degrees with the direction of the normal line of the film surface (formed-layer surface) and then the ultraviolet ray was irradiated again to the formed-layer surface side and backface side of the film at intensities of 100 mJ/cm$^2$ and 200 mJ/cm$^2$ respectively at a symmetric angle of 180 degrees.

(4) The irradiated film was heated to 100° C. and then cooled to room temperature.

The angle dependency of the retardation of the optical anisotropic element produced in this manner is as follows, for example, in the case of the arrangement as shown in FIG. 22. When light passed in the O direction (incident angle: 50 degrees with the normal line of the substrate), the refractive index in the direction parallel to the plane was larger than the refractive index in the direction perpendicular to the plane and the retardation was 60 nm. When light passed in the P direction (incident angle: 50 degrees with the normal line of the substrate), the refractive index in the direction parallel to the plane was smaller than the refractive index in the direction perpendicular to the plane and the retardation was 10 nm. When light passed in the Q and Q' directions (incident angle: 50 degrees with the normal line of the substrate), the refractive index in the direction parallel to the plane was larger than the refractive index in the direction perpendicular to the plane and the retardation was 10 nm.

After the polarized sheet of a liquid crystal color television EV-510 manufactured by Casio Corporation was peeled off, the obtained substrate was applied to the upper or lower side of the liquid crystal cell. Next, a polarized sheet (HEG1425DU, manufactured by Nitto Denko Corporation) was applied to each of the upper and lower sides. The structure of the arrangement of the axis of each optical element was designed to be the same as that shown FIG. 11 shown in the third production process. The results are shown in Table 7.

TABLE 7

| Film | Viewing angle (°) | | | |
|---|---|---|---|---|
| | Upper | Lower | Left | Right |
| Examples | 15 | 43 | 60 | 51 |
| Comparisons (only polarized sheet) | 5 | 20 | 40 | 33 |

This Table 7 clearly indicates that each viewing angle in the upper, lower, left and right directions is enlarged in the retardation film obtained in the fourth example of the third production process.

As outlined above, according to the present invention, a retardation film can be obtained by a simple operation such as exposure even without using such a stretching process as used in prior art. Further, it is possible to produce films used in the fields of those differing in optical axis and therefore, the retardation film of the present invention is expected to be exploited for various optical elements.

Also, the retardation film in which the optical axis is inclined can be exploited as an optical compensation film for enlarging its viewing angle in a liquid crystal display using a twisted nematic liquid crystal utilizing an optical rotation mode or birefringence mode. It has been impossible to produce such a retardation film in which its optical axis is inclined and which has a large area at low costs so far.

However, according to the present invention, an increase in the area of a retardation film can be attained by a simple operation of exposing with light from an oblique direction.

What is claimed is:

1. A process for producing a retardation film comprising irradiating a mixture of a photosensitive polymer and a low molecular weight compound with light, wherein the ratio z of solubility parameters calculated from the evaporation energy and molecular volume of these photosensitive polymer and low molecular weight compound is larger than 0.93 and smaller than 1.06, wherein the light comprises linear polarized light or light in which a perfectly polarized light component and non-polarized light component are intermingled.

2. The process for producing a retardation film according to claim 1, wherein the photosensitive polymer has liquid-crystallinity.

3. A process for producing a retardation film irradiating a mixture of a photosensitive polymer and a low molecular weight compound with light, wherein the ratio z of solubility parameters calculated from the evaporation energy and molecular volume of these photosensitive polymer and low molecular weight compound is larger than 0.93 and smaller than 1.06, wherein the photosensitive polymer is a photosensitive homopolymer or copolymer which has at least one structure represented by the following molecular structures 1 to 9, a main chain represented by the molecular structure 10 is a hydrocarbon, acrylate, methacrylate, maleimide, N-phenylmaleimide or siloxane and the low molecular weight compound has a molecular structure represented by a molecular structure 11 or 12.

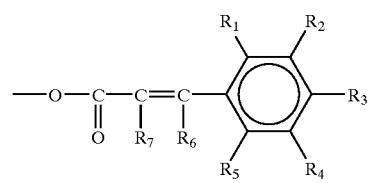

[1]

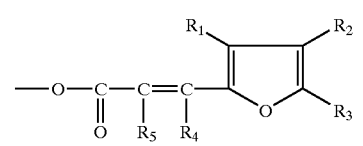

[2]

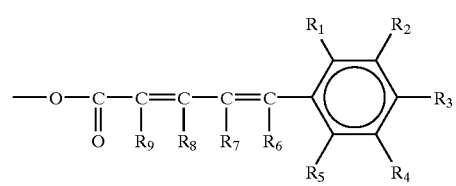

[3]

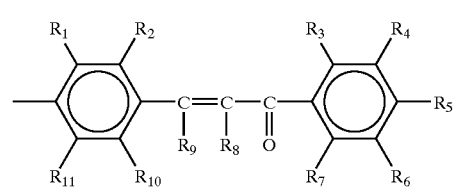

[4]

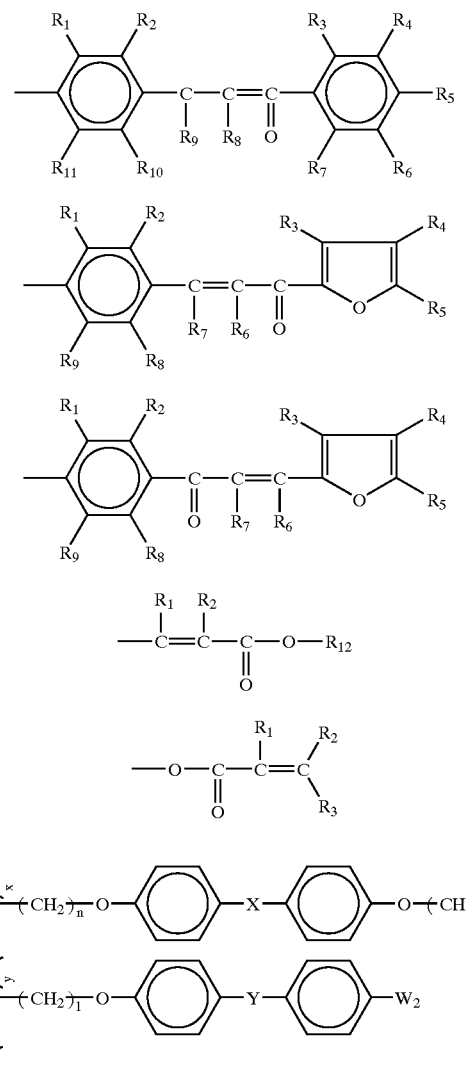

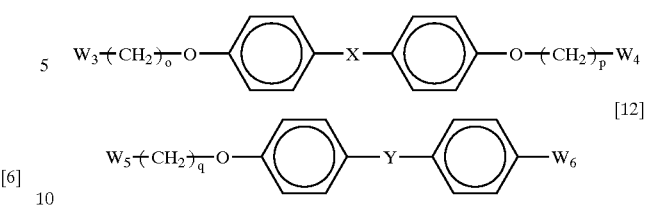

wherein —$R_1$ to —$R_{11}$=—H, halogen group, —CN, alkyl group or alkyloxy group such as methoxy group or group obtained by fluorinating each of these groups, —$R_{12}$=alkyl group, e.g., methyl group or ethyl group or group obtained by fluorinating each of these groups, x:y=100 to 0:0 to 100, n=1 to 12, m=1 to 12, j=1 to 12, o=1 to 12, p=1 to 12, q=1 to 12, X, Y=none, —COO—, —OCO—, —N=N—, —C=C— or —$C_6H_4$—, $W_1$, $W_2$, $W_3$, $W_4$, $W_5$, $W_6$=structure represented by molecular structure 1, 2, 3, 4, 5, 6, 7, 8 or 9.

4. The process for producing a retardation film according to claim 1, wherein the light is irradiated on both of opposite principal surfaces of said mixture.

5. The process for producing a retardation film according to claim 1, further comprising heating and/or cooling a layer of said mixture after said irradiating.

6. The process for producing a retardation film according to claim 1, further comprising crosslinking the photosensitive polymer or low molecular weight compound constituting the film.

7. A retardation film produced by the process as claimed in claim 1.

* * * * *